(12) United States Patent
Shimasaki et al.

(10) Patent No.: US 8,797,115 B2
(45) Date of Patent: Aug. 5, 2014

(54) COUPLER AND ELECTRONIC APPARATUS

(75) Inventors: Hiroshi Shimasaki, Kunitachi (JP);
Takashi Minemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 244 days.

(21) Appl. No.: 13/300,162

(22) Filed: Nov. 18, 2011

(65) Prior Publication Data

US 2012/0274426 A1 Nov. 1, 2012

(30) Foreign Application Priority Data

Apr. 26, 2011 (JP) ................................. 2011-098533

(51) Int. Cl.
*H01P 5/00* (2006.01)
*H01Q 1/38* (2006.01)

(52) U.S. Cl.
USPC .................................. 333/24 R; 343/700 MS

(58) Field of Classification Search
USPC .................. 343/700 MS, 702, 850; 333/24 R
See application file for complete search history.

(56) References Cited

U.S. PATENT DOCUMENTS

| | | | | |
|---|---|---|---|---|
| 6,861,986 B2* | 3/2005 | Fang et al. | ............. | 343/700 MS |
| 6,906,677 B2 | 6/2005 | Yamamoto et al. | | |
| 7,327,316 B2* | 2/2008 | Geoca et al. | ........... | 343/700 MS |
| 7,750,851 B2 | 7/2010 | Washiro | | |
| 7,890,053 B2 | 2/2011 | Washiro | | |
| 7,973,726 B2* | 7/2011 | Tseng et al. | .................. | 343/702 |
| 8,013,795 B2 | 9/2011 | Washiro | | |
| 8,059,035 B2* | 11/2011 | Chang et al. | ........... | 343/700 MS |
| 8,068,495 B2 | 11/2011 | Fleming | | |
| 8,115,692 B2 | 2/2012 | Nakano | | |
| 8,378,894 B2 | 2/2013 | Kikuchi et al. | | |
| 8,451,177 B2* | 5/2013 | Shau et al. | ............. | 343/700 MS |
| 2002/0044099 A1 | 4/2002 | Yamamoto et al. | | |
| 2007/0071034 A1 | 3/2007 | Fleming | | |
| 2008/0064331 A1 | 3/2008 | Washiro | | |
| 2008/0117117 A1 | 5/2008 | Washiro | | |
| 2009/0153405 A1 | 6/2009 | Kikuchi et al. | | |

(Continued)

FOREIGN PATENT DOCUMENTS

| | | |
|---|---|---|
| JP | 2002-050923 | 2/2002 |
| JP | 2003-124742 | 4/2003 |

(Continued)

OTHER PUBLICATIONS

Office Action received in Japanese Patent Application No. 2012-162674, mailed on May 21, 2013; in 7 pages.

(Continued)

*Primary Examiner* — Dean O Takaoka
(74) *Attorney, Agent, or Firm* — Knobbe, Martens, Olson & Bear LLP

(57) ABSTRACT

According to one embodiment, a coupler transmits and receives an electromagnetic wave by electromagnetic coupling between the coupler and another coupler. The coupler includes a line-shaped coupling element having a first open end and a second open end, a ground plane, a feeding element connecting the coupling element and a feed point, and a short circuiting element connecting the coupling element and the ground plane. The feeding element comprises a first end connected to an intermediate portion of the coupling element between the first open end and the second open end, and a second end connected to the feed point. The short circuiting element comprises a third end connected to the intermediate portion of the coupling element, and a fourth end connected to the ground plane.

10 Claims, 19 Drawing Sheets

(56) References Cited

U.S. PATENT DOCUMENTS

| | | |
|---|---|---|
| 2009/0231200 A1* | 9/2009 | Chiu et al. ............. 343/700 MS |
| 2010/0134361 A1 | 6/2010 | Nakano |
| 2010/0233958 A1 | 9/2010 | Washiro |
| 2010/0321906 A1 | 12/2010 | Nakano |

FOREIGN PATENT DOCUMENTS

| | | |
|---|---|---|
| JP | 2004-048471 | 2/2004 |
| JP | 2005-117458 | 4/2005 |
| JP | 2008-099234 A2 | 4/2008 |
| JP | 2008 154198 A2 | 7/2008 |
| JP | 2008-312074 A2 | 12/2008 |
| JP | 2009-512240 | 3/2009 |
| JP | 2009-152686 | 7/2009 |
| JP | 2010-130535 | 6/2010 |
| JP | 2010-288175 | 12/2010 |

OTHER PUBLICATIONS

Office Action received in Japanese Patent Application No. 2011-098533, mailed on Feb. 7, 2012; in 5 pages.

* cited by examiner

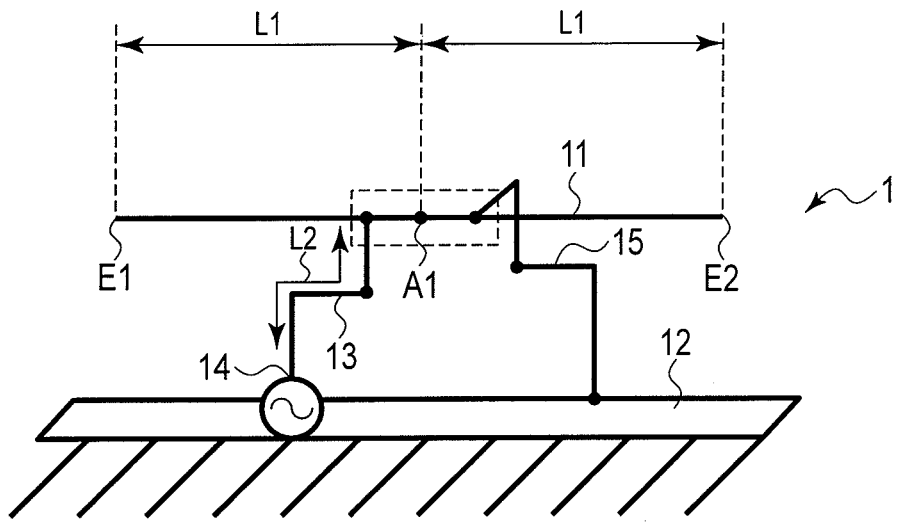
F I G. 7
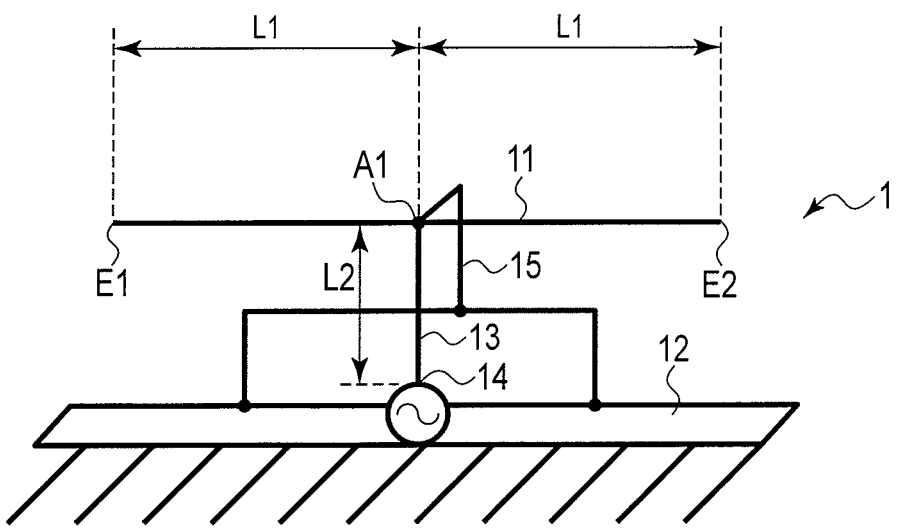
F I G. 8

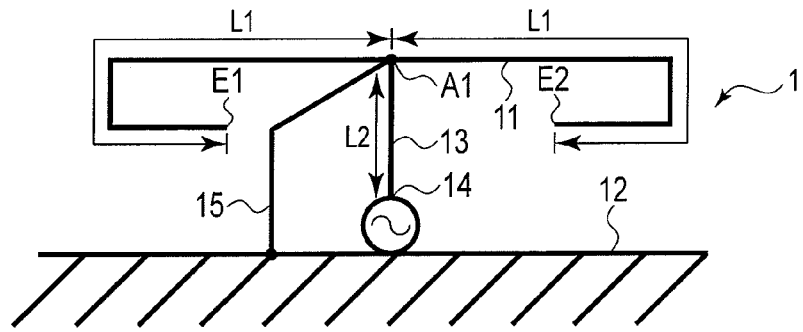
F I G. 13
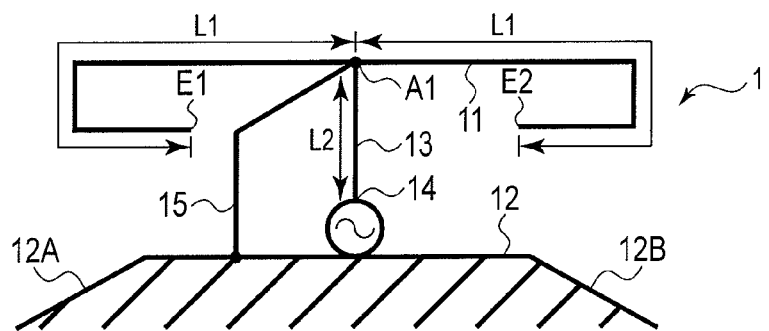
F I G. 14
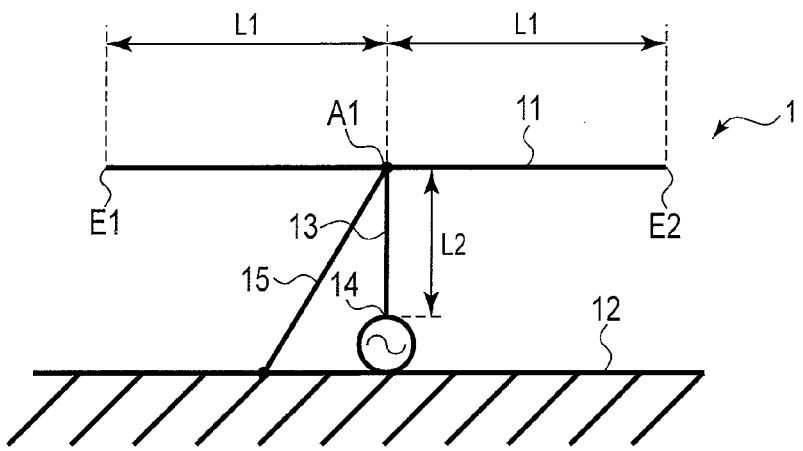
F I G. 15

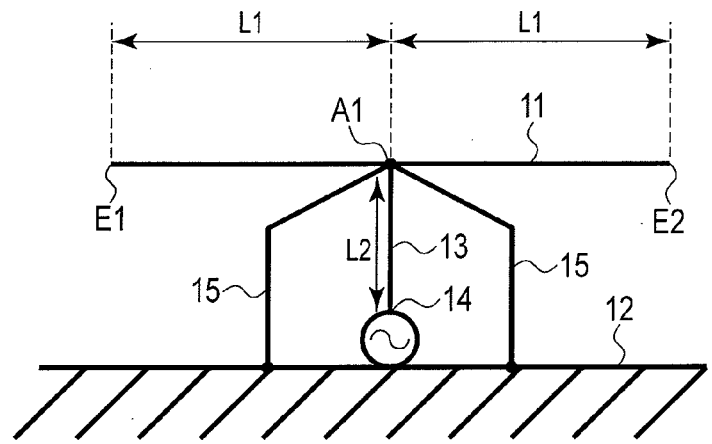
F I G. 16
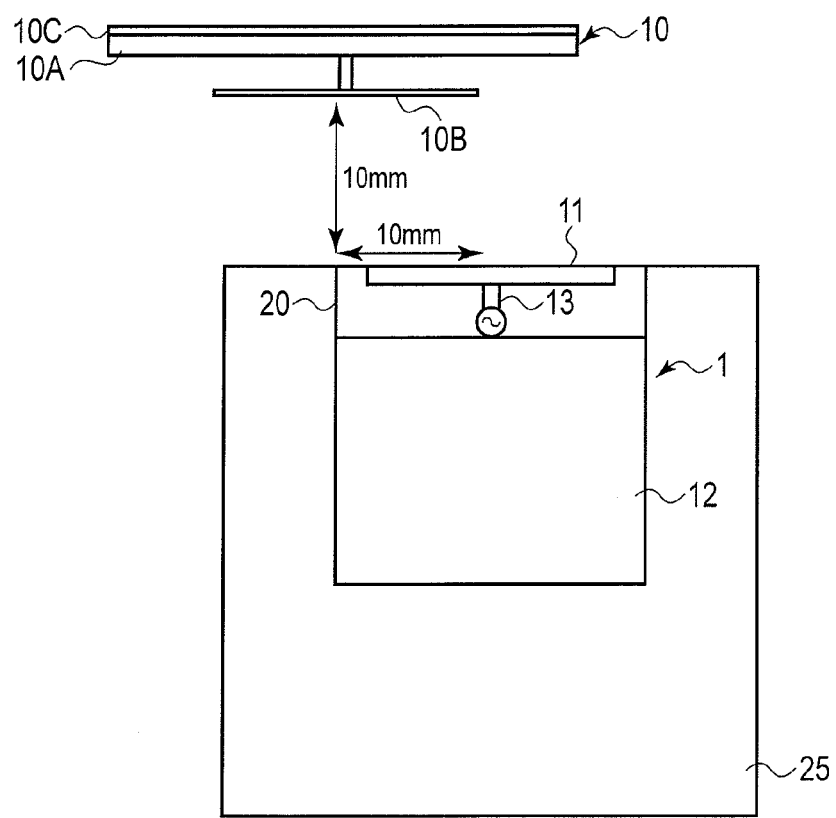
F I G. 17

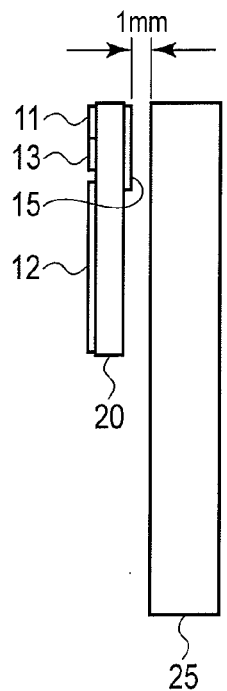
F I G. 18
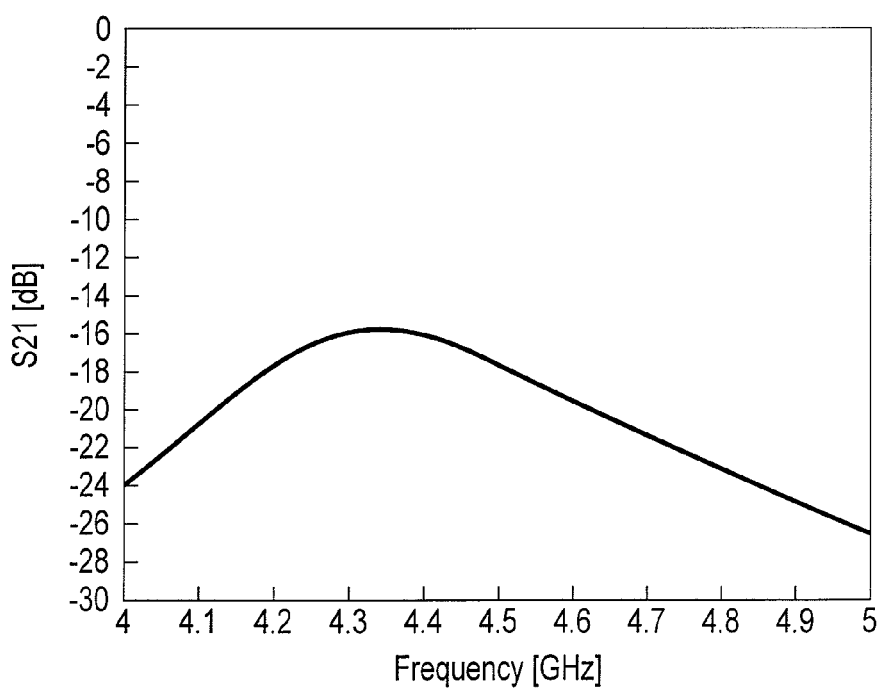
F I G. 19

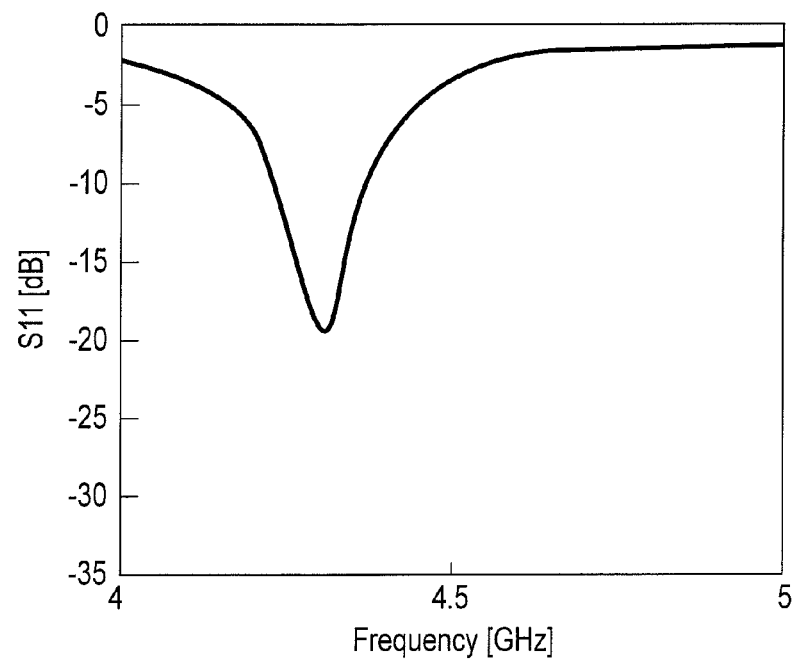
F I G. 20
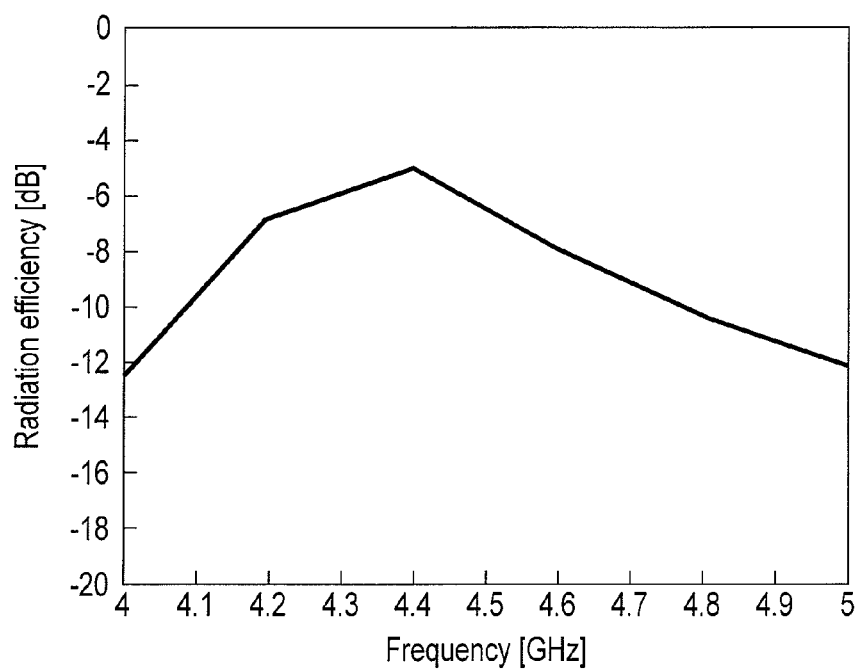
F I G. 21

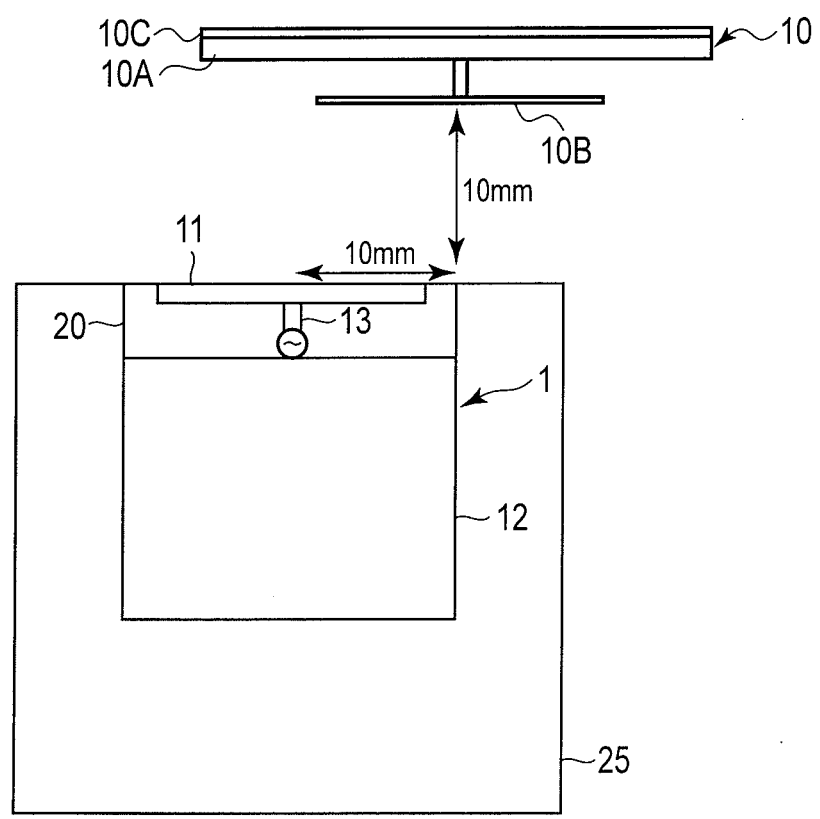
F I G. 22

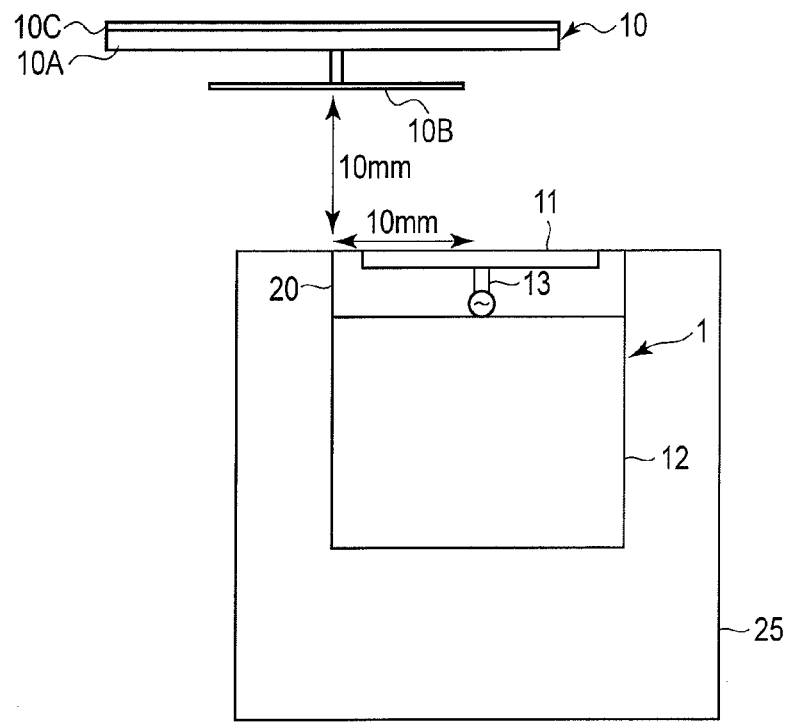
F I G. 23
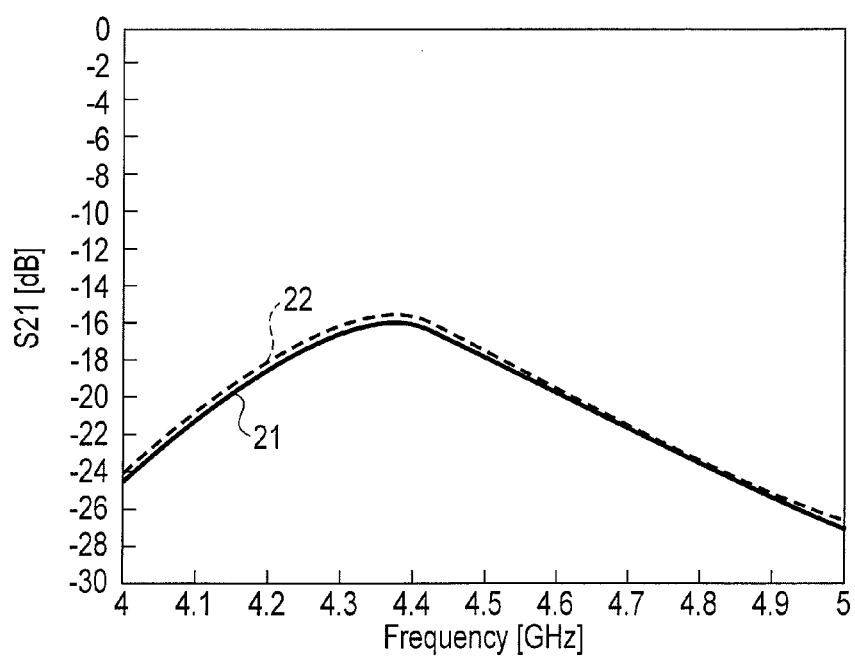
F I G. 24

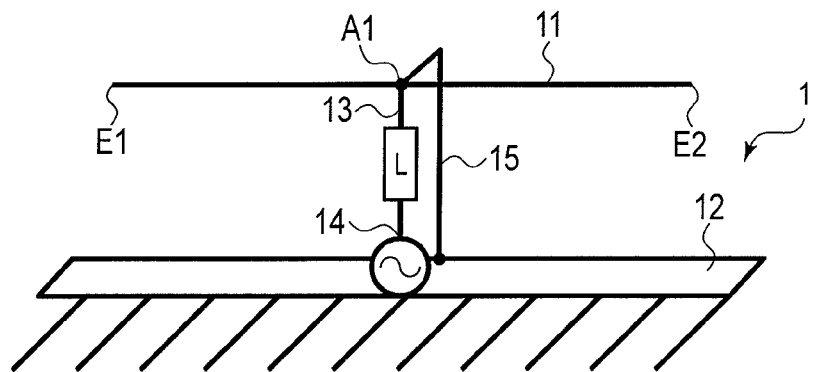
F I G. 33
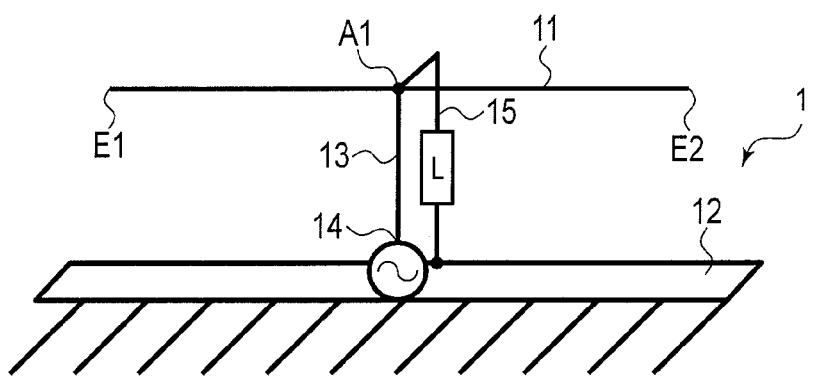
F I G. 34
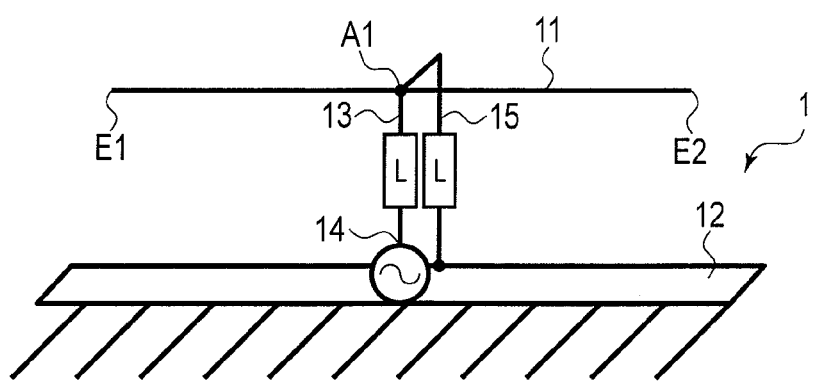
F I G. 35

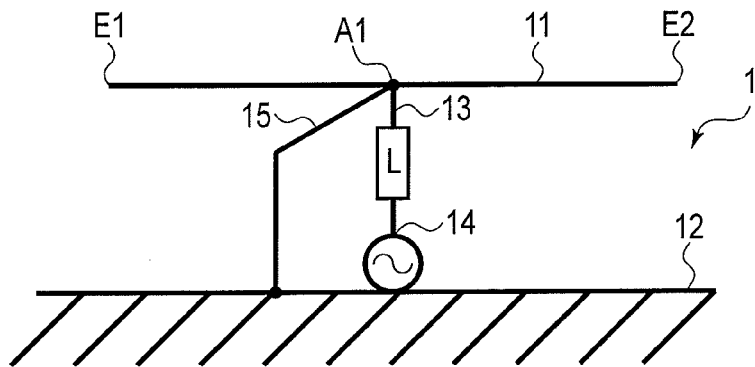
F I G. 36
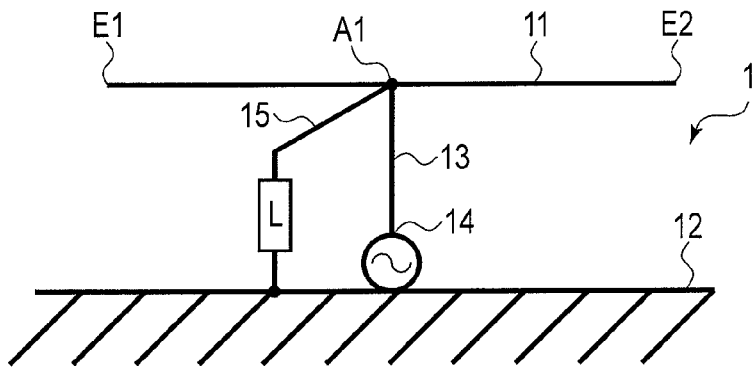
F I G. 37
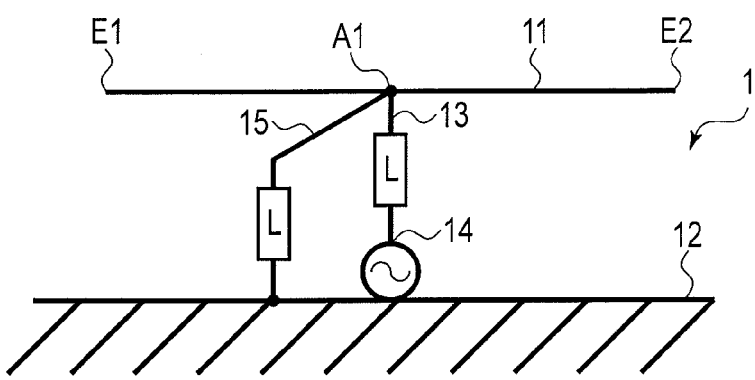
F I G. 38

COUPLER AND ELECTRONIC APPARATUS

CROSS-REFERENCE TO RELATED APPLICATIONS

This application is based upon and claims the benefit of priority from prior Japanese Patent Application No. 2011-098533, filed Apr. 26, 2011, the entire contents of which are incorporated herein by reference.

FIELD

Embodiments described herein relate generally to a coupler to transmit and receive an electromagnetic wave, for example, a coupler for use in close proximity wireless transfer, and an electronic apparatus.

BACKGROUND

In recent years, the development of a close proximity wireless transfer technology has been promoted. The close proximity wireless transfer enables communication between two devices which are brought close together. Each of the devices having close proximity wireless transfer functions includes a coupler. When the two devices are brought close together within the range of communication, the couplers of the two devices are electromagnetically coupled. By this coupling, the devices can wirelessly transmit and receive signals.

A typical coupler includes, for example, a coupling element, an electrode pole, a resonance stub, and a ground, and the like. The resonance stub functions as a resonance module. The resonance stub is formed by a conductor pattern on a printed circuit board. A signal is supplied to the coupling element via the resonance stub and the electrode pole. As a result, an electric current flows in the coupling element, and an electromagnetic field is generated around the coupler. This electromagnetic field enables electromagnetic coupling between the couplers which are provided in the two devices which are brought close together.

In the meantime, a coupler is required to have a sufficient tolerance to a positional displacement between this coupler and a counterpart coupler. This aims at preventing the wireless communication between the devices from being affected, even when the positional relationship between the devices which are brought close together is slightly varied.

In addition, the coupler which is included in the device is required to have a high impedance. The reason for this is that if the coupler is mounted in the device, coupling would occur between the coupler and other peripheral components in the device, leading to a decrease in input impedance of the coupler. The decrease in input impedance is a factor which degrades the electromagnetic field radiation efficiency of the coupler.

Moreover, recently, there has been a demand for a lower height of the coupler, so that the coupler may easily be mounted in various devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 7 is an exemplary view illustrating still another configuration of the coupler according to the embodiment;

FIG. 8 is an exemplary view illustrating still another configuration of the coupler according to the embodiment;

FIG. 13 is an exemplary view illustrating still another structure example of the coupler of FIG. 10;

FIG. 14 is an exemplary view illustrating still another structure example of the coupler of FIG. 10;

FIG. 15 is an exemplary view illustrating still another structure example of the coupler of FIG. 10;

FIG. 16 is an exemplary view illustrating still another structure example of the coupler of FIG. 10;

FIG. 17 is an exemplary view for explaining parameters which are used in characteristic measurement of the coupler according to the embodiment;

FIG. 18 is an exemplary view for explaining a distance between the coupler according to the embodiment and a metal plate;

FIG. 19 is an exemplary graph showing S21 characteristics of the coupler according to the embodiment;

FIG. 20 is an exemplary graph showing S11 characteristics of the coupler according to the embodiment;

FIG. 21 is an exemplary graph showing radiation efficiency characteristics of the coupler according to the embodiment;

FIG. 22 is an exemplary view for explaining parameters which are used in coupler characteristic measurement in a case where a reference coupler is displaced rightward, relative to the coupler according to the embodiment;

FIG. 23 is an exemplary view for explaining parameters which are used in coupler characteristic measurement in a case where the reference coupler is displaced leftward, relative to the coupler according to the embodiment;

FIG. 24 is an exemplary graph showing characteristics of the coupler according to the embodiment under the measurement conditions of FIG. 22, and characteristics of the coupler according to the embodiment under the measurement conditions of FIG. 23;

FIG. 33 is an exemplary view illustrating another configuration of the coupler according to the embodiment;

FIG. 34 is an exemplary view illustrating still another configuration of the coupler according to the embodiment;

FIG. 35 is an exemplary view illustrating still another configuration of the coupler according to the embodiment;

FIG. 36 is an exemplary view illustrating still another configuration of the coupler of FIG. 10;

FIG. 37 is an exemplary view illustrating still another configuration of the coupler of FIG. 10; and FIG. 38 is an exemplary view illustrating still another configuration of the coupler of FIG. 10.

DETAILED DESCRIPTION

Various embodiments will be described hereinafter with reference to the accompanying drawings.

In general, according to one embodiment, a coupler transmits and receives an electromagnetic wave by electromagnetic coupling between the coupler and another coupler. The coupler comprises a line-shaped coupling element having a first open end and a second open end; a ground plane; a feeding element connecting the coupling element and a feed point; and a short circuiting element connecting the coupling element and the ground plane. The feeding element comprises a first end connected to an intermediate portion of the coupling element between the first open end and the second open end, and a second end connected to the feed point. The short circuiting element comprises a third end connected to the intermediate portion of the coupling element, and a fourth end connected to the ground plane.

Figure 1:
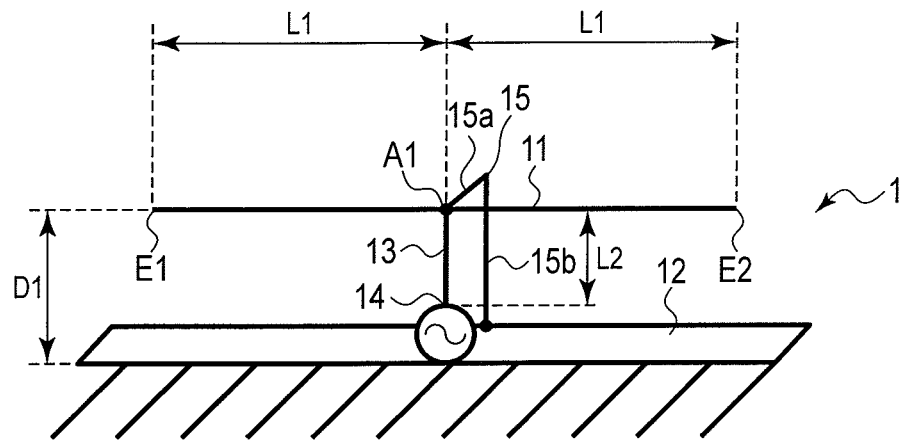
FIG. 1 is an exemplary view illustrating a configuration of a coupler according to an embodiment.

To begin with, referring to FIG. 1, the structure of a coupler 1 according to an embodiment is described. The coupler 1 transmits and receives an electromagnetic wave by electromagnetic coupling between the coupler 1 and another coupler. The coupler 1 is used in close proximity wireless transfer. The close proximity wireless transfer executes data transfer between devices which are brought close together. As the method of close proximity wireless transfer, for example, TransferJet™ may be used. TransferJet™ is a close proximity wireless transfer method which uses UWB (Ultra Wide Band). When two devices have been brought close together within the range of communication (e.g. 3 cm), the couplers provided in these devices are electromagnetically coupled. Thereby, these devices can wirelessly transmit and receive signals to and from each other.

As shown in FIG. 1, the coupler 1 comprises a coupling element 11, a ground plane 12, a feeding element 13, a feed point 14 and a short circuiting element 15. The ground plane 12 has a flat plate shape. Each of the coupling element 11, feeding element 13 and short circuiting element 15 has a line shape.

The coupling element 11 is an elongated element and has a first open end E1 and a second open end E2. The first open end E1 is one end of the coupling element 11, to which nothing is connected. The second open end E2 is the other end of the coupling element 11, to which nothing is connected, either. The coupling element 11 is used for electromagnetic coupling between the coupler 1 and the other coupler. The coupling element 11 is disposed such that the longitudinal direction of the coupling element 11 extends in parallel to the ground plane 12.

The feeding element 13 connects the feed point 14 and the coupling element 11. One end of the feeding element 13 is connected to an intermediate portion A1 between the first open end E1 and second open end E2 of the coupling element 11. On the other hand, the other end of the feeding element 13 is connected to the feed point 14. The intermediate portion A1 of the coupling element 11 is positioned at a middle point in the longitudinal direction of the coupling element 11 or near the middle point.

Figure 2:
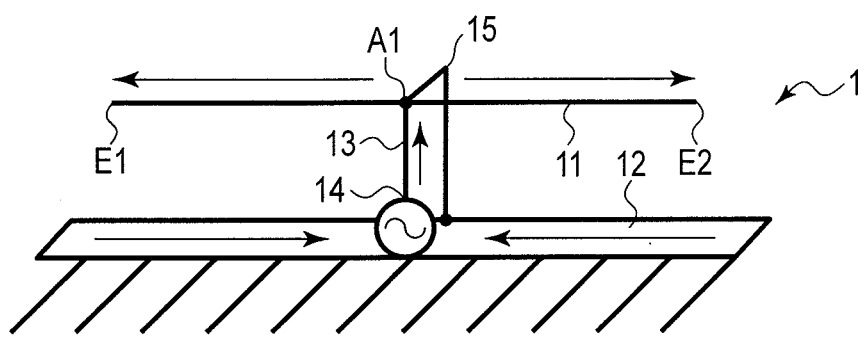
FIG. 2 is an exemplary view for explaining a direction of a current flowing in the coupler according to the embodiment.

FIG. 2 illustrates an electric current which flows in the coupler 1. Arrows in FIG. 2 indicate the directions of the current. In the present embodiment, since the feed point 14 is connected to the intermediate portion A1 of the coupling element 11 via the feeding element 13, as described above, electric currents in opposite directions flow in the coupling element 11. More specifically, an electric current from the intermediate portion A1 toward the first open end E1 and an electric current from the intermediate portion A1 toward the second open end E2 flow in the coupling element 11. In addition, the intensities (current amounts) of these currents are equal. Thus, in the coupling element 11, the current distribution is substantially symmetric with respect to the intermediate portion A1.

The degree of strength of coupling between two opposed couplers tends to be higher in the case where the direction of a current flowing in one of the couplers is opposite to the direction of a current flowing in the other coupler, than in the case where the direction of a current flowing in one of the couplers is identical to the direction of a current flowing in the other coupler. In the present embodiment, since electric currents in opposite directions, which are equal in current amount, can be let to flow in the coupling element 11, the tolerance to a positional displacement between the couplers can be enhanced.

As shown in FIG. 1, the short circuiting element 15 connects (short-circuits) the coupling element 11 and the ground plane 12 in order to increase the impedance (input impedance) of the coupler 1. In this embodiment, the short circuiting element 15 connects the intermediate portion A1 of the coupling element 11 and the ground plane 12 in order to suppress degradation in characteristics of the coupler 1 due to the effect of peripheral components (i.e. the effect by proximity of a metal), without deteriorating the symmetry of currents flowing in the coupling element 11. To be more specific, one end of the short circuiting element 15 is connected to the intermediate portion A1 of the coupling element 11, that is, the connection point between the coupling element 11 and feeding element 13. The other end of the short circuiting element 15 is connected to the ground plane 12. By increasing the distance between the other end of the short circuiting element 15 and the feed point 14, it is possible to adjust the impedance of the coupler 1 within the band and a desired frequency band of the coupler 1. If the distance between the other end of the short circuiting element 15 and the feed point 14 is short, the band that is covered by the coupler 1 becomes a narrow band. If the distance between the other end of the short circuiting element 15 and the feed point 14 is increased, the band that is covered by the coupler 1 becomes a wide band.

If a certain point of the coupling element 11, other than the intermediate portion A1, is connected to the ground plane 12, the high impedance of the coupler 1 can be realized but the current distribution in the coupling element 11 become asymmetric with respect to the intermediate portion A1. Assume now the case in which an intermediate position between the intermediate portion A1 and the first open end E1 is connected to the ground plane 12 by a short circuiting element. In this case, the intensity of a current flowing from the intermediate position between the intermediate portion A1 and the first open end E1 toward the first open end E1 is weaker than the intensity of a current flowing from the intermediate position between the intermediate portion A1 and the first open end E1 toward the second open end E2. In addition, if the end E1 and the ground plane 12 are connected by the short circuiting element, only the current toward the end E2 flows in the coupling element 11, and, as a result, the tolerance to a positional displacement lowers.

In the present embodiment, the short circuiting element 15 connects the intermediate portion A1 of the coupling element 11 (the connection point between the coupling element 11 and the feeding element 13) and the ground plane 12. Thus, the high impedance of the coupler 1 can be realized without preventing electric currents in opposite directions with the same current amount from flowing in the coupling element 11, that is, without weakening the tolerance to a positional displacement of the coupler 1. By realizing the high impedance of the coupler 1, it is possible to suppress degradation in characteristics of the coupler 1 due to the effect of peripheral components (i.e. the effect by proximity of a metal).

Besides, the coupling element 11, feeding element 13 and feed point 14 may be disposed on a first plane, and the short circuiting element 15 may be disposed on a second plane which is opposed to the first plane with a gap. The short circuiting element 15 on the second plane may be connected to the intermediate portion A1 of the coupling element 11 on the first plane via an element portion (connection portion) 15$a$ which extends between the first plane and the second plane. The element portion 15$a$ functions as a part of the short circuiting element 15.

To be more specific, the short circuiting element 15 comprises at least two element portions 15$a$ and 15$b$. The element portion 15$a$ extends between the first plane and the second plane. The element portion 15$a$ extends from the intermediate portion A1 of the coupling element 11 in a direction vertical to the first plane. One end of the element portion 15$a$ is connected to the intermediate portion A1 of the coupling element 11. The other end of the element portion 15$a$ is connected to the second plane.

The element portion 15$b$ is disposed on the second plane. On the second plane, the element portion 15$b$ is disposed such that the element portion 15$b$ extends in parallel to the feeding element 13 on the first plane. One end of the element portion 15$b$ is connected to the other end of the element portion 15$a$. The other end of the element portion 15$b$ is electrically connected to the ground plane 12.

The ground plane 12 is disposed, for example, on the first plane. In this case, the other end of the short circuiting element 15 is connected to the ground plane 12 via another element portion (connection portion) extending between the first plane and the second plane. Needless to say, the ground plane 12 may be disposed on the second plane. In addition, the ground plane 12 may be disposed on each of the first plane and the second plane.

In the structure of FIG. 1, as described above, the coupling element 11, ground plane 12, feeding element 13 and feed point 14 are disposed on the first plane, and the short circuiting element 15 is formed by using the element portion 15$a$ extending between the first plane and the second plane and the element portion 15$b$ which is disposed on the second plane. In this structure, since the short circuiting element 15 and feeding element 13 are substantially symmetric with respect to the intermediate portion A1 of the coupling element 11, the symmetry of the current distribution in the coupling element 11 can be enhanced.

To be more specific, with the structure of FIG. 1, the current distribution in the coupling element 11 can be made substantially completely symmetric with respect to the intermediate portion A1. This will also be understood from the fact that when this structure is applied to the coupler 1, the shape of the coupler 1 on the first plane becomes identical to the shape of a so-called T-type monopole antenna. In other words, in the structure of FIG. 1, the short circuiting element 15 hardly adversely affects the symmetry of the current distribution in the coupling element 11.

In the meantime, a dielectric body may be inserted as a spacer between the first plane and the second plane.

The electrical length from the feed point 14 to each of the first open end E1 and second open end E2 is ¼ of the wavelength $\lambda$ corresponding to a central frequency of electromagnetic waves (radio signal) which is transmitted and received by the coupler 1. In other words, the sum of ½ of the electrical length between the end E1 and end E2 of the coupling element 11 and the electrical length of the feeding element 13 is ¼ of the wavelength $\lambda$.

In addition, the electrical length of the element portion 15$a$ extending from the first plane in the vertical direction is ¹⁄₁₀ or less of the wavelength $\lambda$.

If ½ of the length of the coupling element 11 is L1 and the length of the feeding element 13 is L2, L1+L2 is $\lambda$/4. Thereby, a part of the coupling element 11 (i.e. a part between the intermediate portion A1 and the first open end E1) and the feeding element 13 function as a resonance coupler module (resonance module). In addition, another part of the coupling element 11 (i.e. a part between the intermediate portion A1 and the second open end E2) and the feeding element 13 function as another resonance coupler module (resonance module). Therefore, a wireless signal of a desired frequency can be transmitted and received, without providing a purpose-specific resonance module such as a resonance stub between the coupling element 11 and the ground plane 12.

Thus, with the structure of the coupler 1 of the present embodiment, a distance D1 between the ground plane 12 and coupling element 11 can be decreased, compared to the case of adopting the structure in which a resonance module is disposed between the ground plane and the coupling element. In other words, with the structure of the coupler 1 of this embodiment, the necessary mounting area can greatly be reduced, compared to an ordinary coupler in which a resonance module is provided in addition to the coupling element. Moreover, by setting the length of the element portion 15$a$ of the short circuiting element 15 at a short length of ¹⁄₁₀ of the wavelength $\lambda$, the coupler 1 can be realized in a thin rectangular shape. Thereby, the coupler 1 can easily be mounted on a thin substrate (thin dielectric substrate), and the coupler 1 can be reduced in size and thickness.

In the ordinary coupler in which the resonance module is provided in addition to the coupling element, the mounting area increases by an area of the resonance module, and in the state in which a metal is positioned close to the coupler, the current flowing in the coupling element is decreased. Consequently, it is possible that the characteristics (e.g. radiation efficiency) of the coupler deteriorate. In the coupler 1 of the embodiment, the input impedance of the coupler 1 can be increased in the state in which the current distribution in the coupling element 11 is kept symmetric with respect to the intermediate portion A1. Thus, even if a metal is positioned close to the coupler 1, a large current can be let to flow in the coupling element 11. Therefore, degradation in characteristics of the coupler 1 at a time of close proximity to a metal (e.g. radiation efficiency, S21, etc.) can be suppressed.

Figure 3:
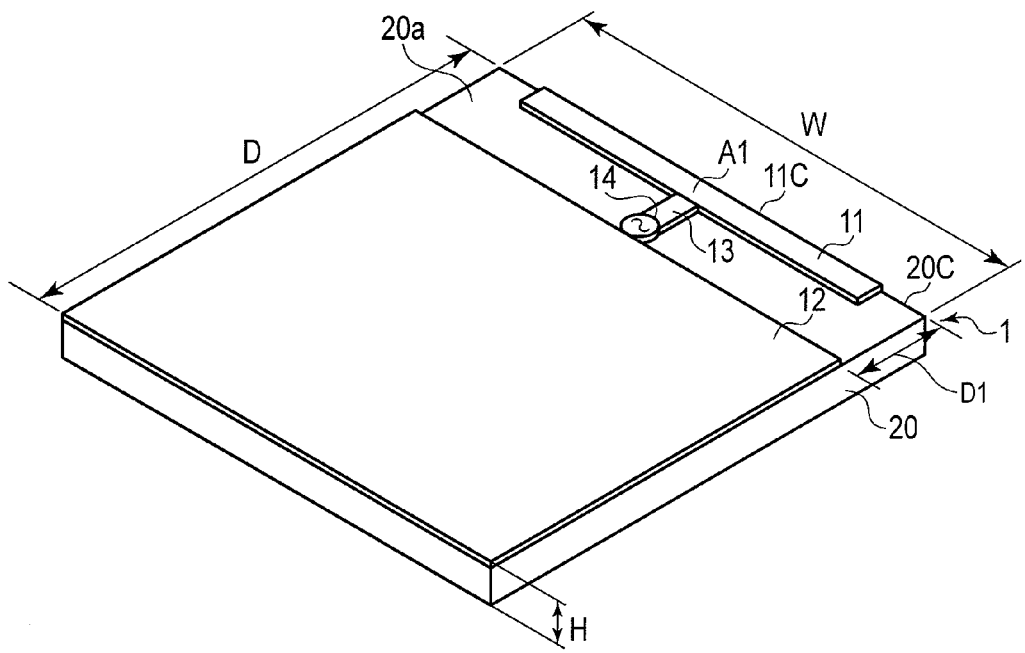
FIG. 3 is an exemplary perspective view illustrating a mounting structure of the coupler according to the embodiment.
Figure 4:
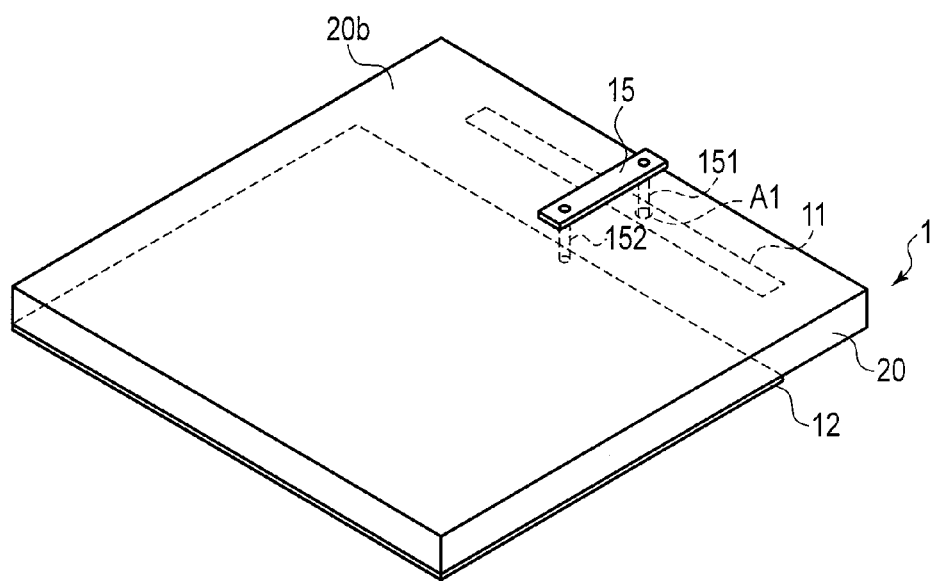
FIG. 4 is an exemplary perspective view of the mounting structure of the coupler shown in FIG. 3, as viewed from a back side.

Next, referring to FIG. 3 and FIG. 4, an example of a mounting structure for realizing the coupler 1 of FIG. 1 is described. The description below is given of the case of using a substrate (dielectric substrate) as the above-described spacer.

A coupler structure shown in FIG. 3 and FIG. 4 corresponds to a planar coupler. FIG. 3 is a perspective view of the coupler 1, as viewed from a front side of the substrate, and FIG. 4 is a perspective view of the coupler 1, as viewed from a back side of the substrate.

As shown in FIG. 3, the coupler 1 comprises a substrate (dielectric substrate) 20. The substrate 20 has a rectangular shape with a width W, a depth D and a height H. The substrate 20 is a thin substrate, and its height H is 1/10 or less of the wavelength λ corresponding to a central frequency of electromagnetic waves (radio signal) which is transmitted and received by the coupler 1. A coupling element 11, a ground plane 12, a feeding element 13 and a feed point 14 are disposed on a first surface 20a of the substrate 20.

The first surface 20a corresponds to the above-described first plane. The coupling element 11, feeding element 13 and feed point 14 are disposed in a first area on the first surface 20a of the substrate 20. The coupling element 11 is disposed in the first area on the first surface 20a of the substrate 20 in such a manner that the longitudinal direction of the coupling element 11 extends in parallel to one side 20c which extends in the direction of the width W of the substrate 20. In this case, the coupling element 11 may be disposed in the first area on the first surface 20a of the substrate 20 in such a manner that a long side 11c of the coupling element 11 is flush with the side 20c of the first surface 20a of the substrate 20. The feeding element 13 extends between the intermediate portion A1 of the coupling element 11 and the feed point 14. The ground plane 12 is disposed in a second area on the first surface 20a of the substrate 20.

The coupling element 11 and feeding element 13 may be realized by metallic wiring patterns. The ground plane 12 may be realized by a plate-shaped ground layer. In addition, a communication module, which is electrically connected to the coupler 1, may be provided on the substrate 20.

This communication module is a communication device which is configured to execute close proximity wireless transfer with another device via the coupler 1.

As shown in FIG. 4, a short circuiting element 15 is disposed in a third area on a second surface (back surface) 20b of the substrate 20. The second surface (back surface) 20b corresponds to the above-described second plane. The third area on the second surface (back surface) 20b of the substrate 20 is opposed to the first area on the first surface 20a of the substrate 20. The short circuiting element 15 on the second surface (back surface) 20b corresponds to the above-described element portion 15b. On the second surface (back surface) 20b, the short circuiting element 15 extends between a position opposed to the intermediate portion A1 of the coupling element 11 on the first surface 20a and a position opposed to the ground plane 12 on the first surface 20a. In this case, the short circuiting element 15 may be configured to extend substantially in parallel to the feeding element 13 in such a manner that the short circuiting element 15 is opposed to the feeding element 13 via the substrate 20. Thereby, the short circuiting element 15 and feeding element 13 are configured to be substantially symmetric with respect to the intermediate portion A1 of the coupling element 11. One end of the short circuiting element 15 is connected to the intermediate portion A1 of the coupling element 11 on the first surface 20a of the substrate 20, for example, via a through-hole 151 in the substrate 20.

The through-hole 151 extends from the intermediate portion A1 of the coupling element 11 in a direction vertical to the first surface 20a. The through-hole 151 corresponds to the above-described element portion (connection portion) 15a. Needless to say, instead of using the through-hole 151 as the above-described element portion (connection portion) 15a, it is possible to use, as the element portion (connection portion) 15a, a wiring pattern which is disposed on one side surface (i.e. a side surface including the side 20c) of the substrate 20. In this case, one end of the short circuiting element 15 is connected to the intermediate portion A1 of the coupling element 11 on the first surface 20a of the substrate 20 via the wiring pattern which is disposed on one side surface (i.e. a side surface including the side 20c) of the substrate 20.

The other end of the short circuiting element 15 is connected to the ground plane 12 on the first surface 20a of the substrate 20, for example, via a through-hole 152 in the substrate 20. Needless to say, the other end of the short circuiting element 15 may be connected to the ground plane 12 via a wiring pattern or the like, other than the through-hole 152.

In the meantime, the ground plane 12 may be disposed in a fourth area on the second surface 20b of the substrate 20. The fourth area on the second surface 20b is an area which is not opposed to the first area on the first surface 20a of the substrate 20. For a reason described below, the ground plane 12 is disposed in the fourth area on the second surface 20b of the substrate 20, the fourth area not being opposed to the first area on the first surface 20a of the substrate 20.

In the planar coupler structure shown in FIG. 3 and FIG. 4, the coupling element 11, feeding element 13 and short circuiting element 15 are not opposed to the ground plane 12. Thus, even when a thin substrate is used as the substrate 20, it is possible to prevent the energy loss of the coupler 1 from increasing. The reason for this is as follows.

The characteristics of the coupler 1 are affected by the distance between the coupling element 11 and the ground plane 12. If the distance between the coupling element 11 and the ground plane 12 is too short, a part of the electromagnetic field, which is generated from the coupling element 11, tends to easy enter the ground plane 12, owing to the coupling between the coupling element 11 and the ground plane 12. Thereby, an energy loss occurs, and the electromagnetic coupling between the coupler 1 and the other coupler is weakened. If the distance between the coupling element 11 and the ground plane 12 is set to be long, the coupling between the coupling element 11 and the ground plane 12 can be avoided. However, in order to increase the distance between the coupling element and the ground plane, it is necessary to increase the coupler mounting area or the distance D1, leading to a factor that increases the height of the coupler 1. In the present embodiment, since the coupling element 11 is not opposed to the ground plane 12, a sufficient distance can easily be secured between the coupling element 11 and the ground plane 12. Therefore, even when a thin substrate is used as the substrate 20, an increase of the energy loss of the coupler 1 can be prevented.

Next, referring to FIG. 5 to FIG. 9, some other structure examples of the coupler 1 of the embodiment are described.

Figure 5:
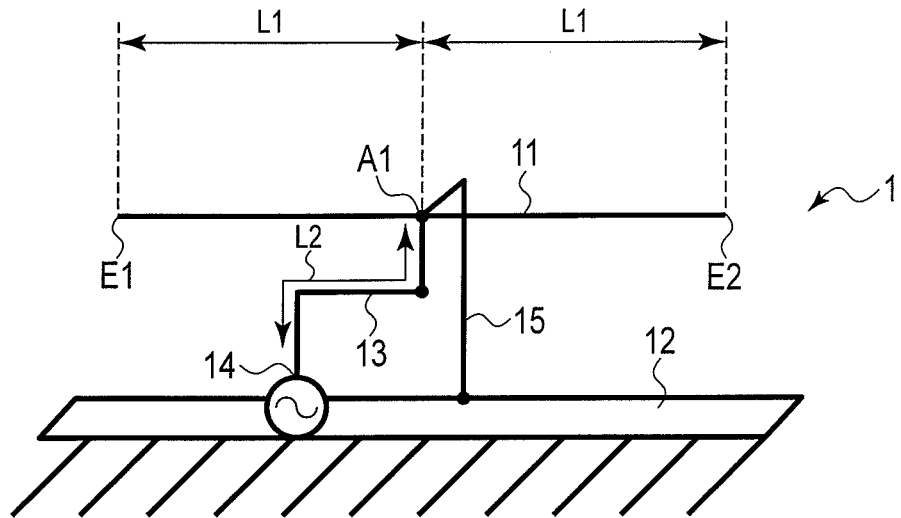
FIG. 5 is an exemplary view illustrating another configuration of the coupler according to the embodiment.

In a coupler 1 shown in FIG. 5, the feed point 14 is not provided at a position immediately below the intermediate portion A1, but at a position (offset position) which is obtained by adding an offset to the position immediately below the intermediate portion A1. Even if the position of the feed point 14 is shifted to the offset position from the position immediately below the intermediate portion A1, the same advantageous effects as with the structure of FIG. 1 can be obtained.

Figure 6:
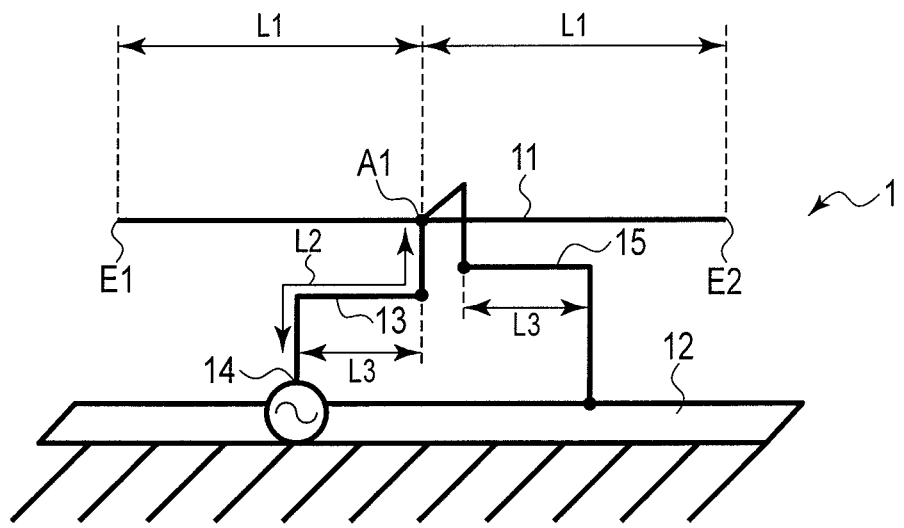
FIG. 6 is an exemplary view illustrating still another configuration of the coupler according to the embodiment.
Figure 9:
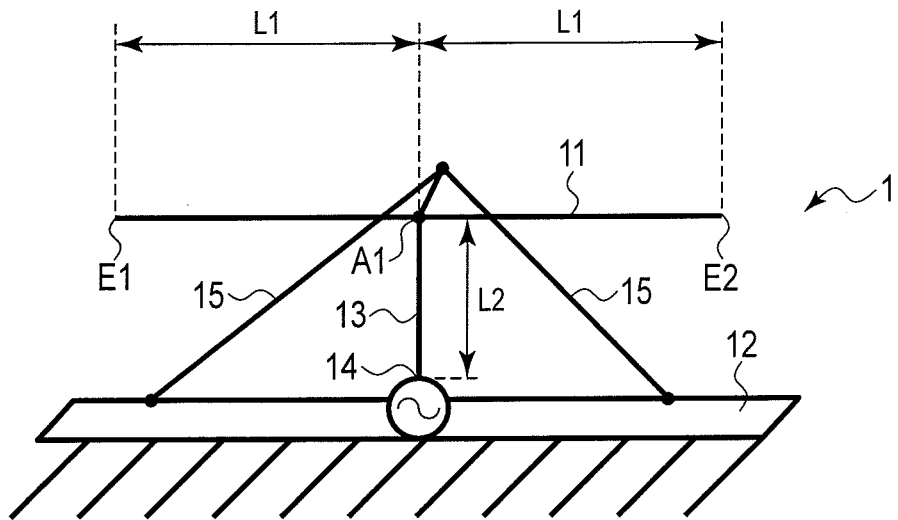
FIG. 9 is an exemplary view illustrating still another configuration of the coupler according to the embodiment.

In a coupler 1 shown in FIG. 6, not only the feed point 14 but also a short-circuit point (i.e. the connection point between the short circuiting element 15 and ground plane 12) is offset. To be more specific, the feed point 14 is not provided at a position immediately below the intermediate portion A1, but at a position (offset position) which is obtained by adding an offset in a first direction to the position immediately below the intermediate portion A1. The short-circuit point is not provided at a position immediately below the intermediate portion A1, but at a position (offset position) which is obtained by adding an offset in a second direction to the position immediately below the intermediate portion A1. An offset length (L3) in the first direction is equal to an offset length (L3) in the second direction. In addition, the second direction is opposite to the first direction.

As described above, in the structure of FIG. 6, the feeding element 13 and short circuiting element 15 are commonly connected to the intermediate portion A1 of the coupling element 11, and the feed point 14 and the short-circuit point are offset by the same distance in opposite directions. Therefore, the symmetry of the current distribution in the coupler 1 can be made higher than in the structure of FIG. 5.

In a coupler 1 shown in FIG. 7, the feed point 14 and the short-circuit point are offset in opposite directions by the same distance, and the connection point between the feeding element 13 and coupling element 11 and the connection point between the short circuiting element 15 and coupling element 11 are spaced apart by a slight distance.

In a coupler 1 shown in FIG. 8, the short circuiting element 15 is connected to the ground plane 12 at a plurality of connection points (short-circuit points). Similarly, in a coupler 1 shown in FIG. 9, the short circuiting element 15 is connected to the ground plane 12 at a plurality of connection points (short-circuit points).

Figure 10:
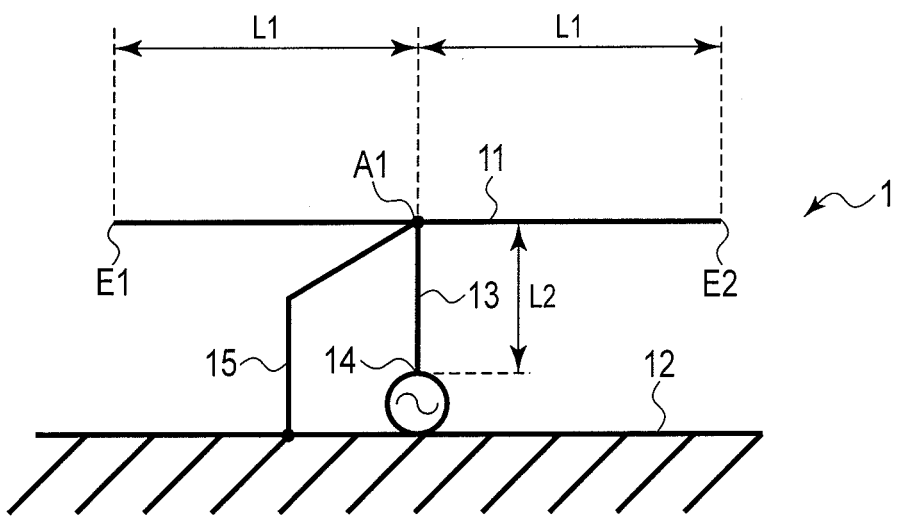
FIG. 10 is an exemplary view illustrating a structure example which enables mounting on one plane, this structure example being applied to the coupler according to the embodiment.

Next, referring to FIG. 10, a description is given of a structure example of a coupler 1 which can be disposed on one plane.

In the coupler 1 of FIG. 10, a short circuiting element 15 is disposed on the first plane on which the coupling element 11 and feeding element 13 are disposed. The short circuiting element 15 has a bent shape, as shown in FIG. 10, and one end of the short circuiting element 15 is connected to the intermediate portion A1 of the coupling element 11. The other end of the short circuiting element 15 is connected to the ground plane 12. In the coupler 1 of FIG. 10, the current distribution in the coupling element 11 can be made substantially symmetric with respect to the intermediate portion A1. In addition, the structure of the coupler 1 of FIG. 10 has such a merit that the coupler 1 can easily be realized by simply using one surface alone of the substrate.

Figure 11:
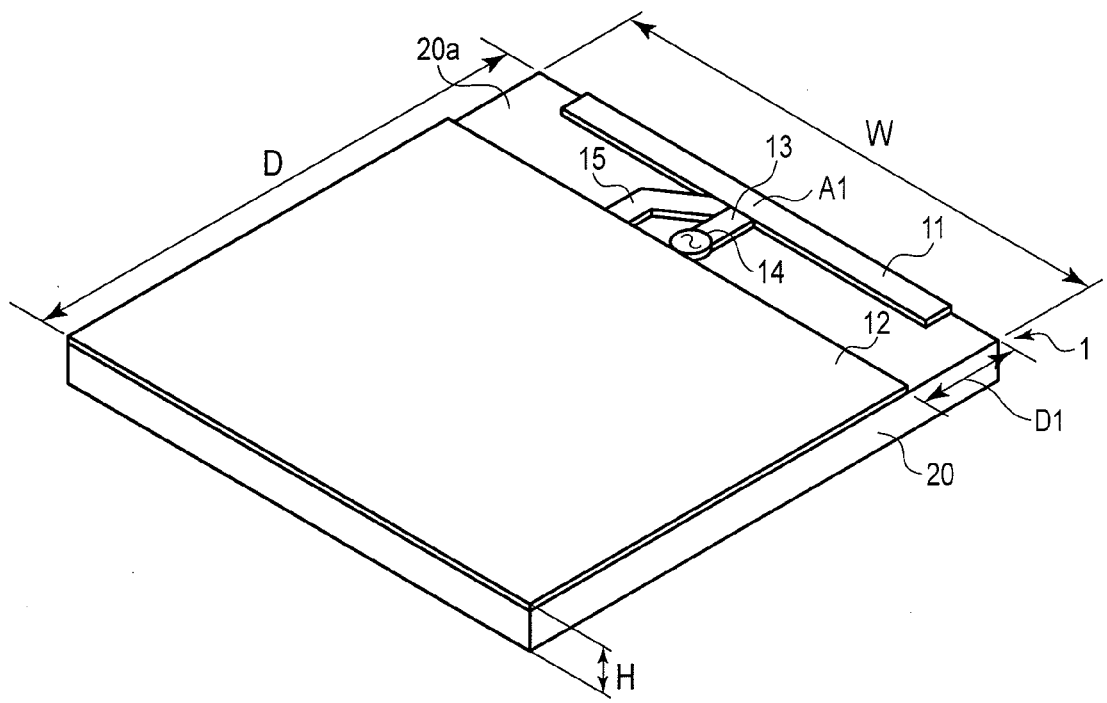
FIG. 11 is an exemplary perspective view illustrating an example of a mounting structure of the coupler of FIG. 10.

FIG. 11 shows an example of a mounting structure for realizing the coupler 1 of FIG. 10. FIG. 11 is a perspective view of the coupler 1, as viewed from the front surface side of the substrate.

As shown in FIG. 11, the coupler 1 comprises a substrate (dielectric substrate) 20. On a first surface 20a of the substrate 20, a coupling element 11, a ground plane 12, a feeding element 13, a feed point 14 and a short circuiting element 15 are disposed.

To be more specific, the coupling element 11, feeding element 13, feed point 14 and short circuiting element 15 are disposed in a first area on the first surface 20a of the substrate 20. The coupling element 11 is disposed in the first area on the first surface 20a of the substrate 20 in such a manner that the longitudinal direction of the coupling element 11 extends in parallel to the direction of the width W of the substrate 20. The feeding element 13 extends between the intermediate portion A1 of the coupling element 11 and the feed point 14. The short circuiting element 15 is disposed between the intermediate portion A1 of the coupling element 11 and the ground plane 12.

The coupling element 11 and feeding element 13 may be realized by metallic wiring patterns. The ground plane 12 may be realized by a plate-shaped ground layer. In addition, a communication module, which is electrically connected to the coupler 1, may be provided on the substrate 20.

Next, referring to FIG. 12 to FIG. 16, some other structure examples of the coupler 1, which can be mounted on one plane, are described.

In a coupler 1 shown in FIG. 12, the feed point 14 is not provided at a position immediately below the intermediate portion A1, but at a position (offset position) which is obtained by adding an offset to the position immediately below the intermediate portion A1. In addition, the connection point (short-circuit point) between the short circuiting element 15 and the ground plane 12 is offset in a direction opposite to the direction of offset of the feed point 14.

Figure 12:
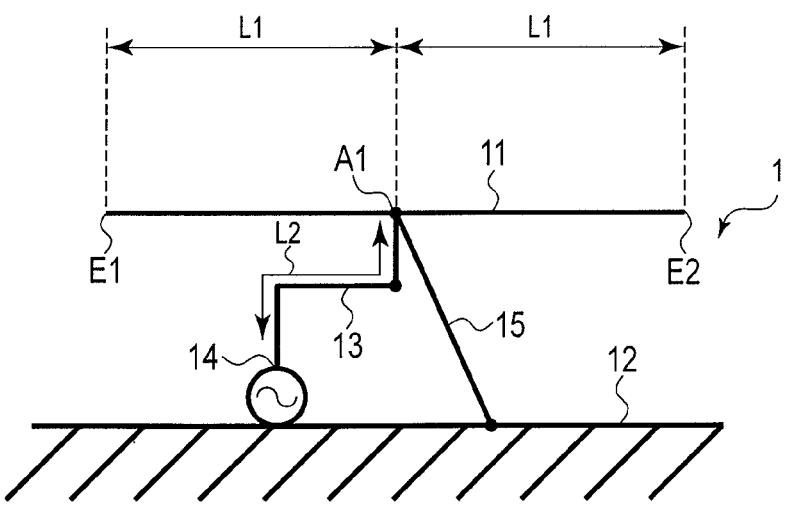
FIG. 12 is an exemplary view illustrating another structure example of the coupler of FIG. 10.

Furthermore, in the coupler 1 shown in FIG. 12, the short circuiting element 15 has a line shape.

In a coupler 1 shown in FIG. 13, both end portions of the coupling element 11 are bent downward. With this structure, even in the case where the width W of the substrate 20 is small, the length of the coupling element 11 can be set at a proper length.

In a coupler 1 shown in FIG. 14, both end portions of the coupling element 11 are bent downward. Further, both side portions of an upper end part of the ground plane 12 are cut off, and tapers 12A and 12B are provided on both sides of the upper end of the ground plane 12. With this structure, even in the case where both end portions of the coupling element 11 are bent downward, a sufficient distance between the coupling element 11 and the ground plane 12 can be secured.

In a coupler 1 shown in FIG. 15, the short circuiting element 15 has a line shape.

In a coupler 1 shown in FIG. 16, two short circuiting elements 15 are provided on both sides of the feeding element 13. Since the two short circuiting elements 15 are provided on both sides of the feeding element 13, the symmetry of the current distribution can be more than in the structure of FIG. 10.

Next, referring to FIG. 17 to FIG. 21, results of the characteristic measurement of the coupler 1 are explained. The case is now assumed in which the coupler 1 is configured to be mounted on two planes. FIG. 17 and FIG. 18 illustrate conditions for measurement. FIG. 19 shows S21 characteristics of the coupler 1 under the conditions for measurement shown in FIG. 17 and FIG. 18. The horizontal axis of FIG. 19 indicates a frequency, and the vertical axis of FIG. 19 indicates a transmission coefficient (S21 [dB]). Similarly, FIG. 20 shows return-loss characteristics (S11 [dB]) of the coupler 1 under the conditions for measurement shown in FIG. 17 and FIG. 18, and FIG. 21 shows radiation efficiency of the coupler under the conditions for measurement shown in FIG. 17 and FIG. 18. The conditions for measurement are as follows.

In FIG. 17, a metal plate 25 is disposed on the back side of the coupler 1. In the state in which the coupler 1 is mounted in an electronic apparatus, metals (other peripheral components in the electronic apparatus) are preset near the coupler 1. In order to reproduce this environment, the metal plate 25 is disposed on the back side of the coupler 1. As shown in FIG. 18, the distance between the coupler 1 and metal plate 25 is 1 mm.

As shown in FIG. 17, a coupling element 10B of a reference coupler 10 is displaced by 10 mm to the left, relative to the coupling element 11 of the coupler 1. In addition, the offset distance in the vertical direction between the coupler 1 and the reference coupler 10 is set at 10 mm. An ordinary coupler widely known in the field may be used as the reference coupler 10. In the example of FIG. 17, the reference coupler 10 comprises a substrate 10A, the coupling element 10B and a ground plane 10C.

Even in the case where a metal is present in the vicinity of the coupler 1 and the position of the reference coupler 10 is displaced from the coupler 1, adequate coupler characteristics can be obtained, as is understood from FIG. 19, FIG. 20 and FIG. 21.

Next, referring to FIG. 22, FIG. 23 and FIG. 24, other examples of results of the characteristic measurement of the coupler 1 are explained. The case is now assumed in which the coupler 1 is configured to be mounted on two planes. FIG. 22 and FIG. 23 illustrate conditions for measurement. FIG. 24 shows characteristics (curve 21) of the coupler 1 under the condition for measurement shown in FIG. 22 and characteristics (curve 22) of the coupler 1 under the condition for measurement shown in FIG. 23. The horizontal axis of FIG. 24 indicates a frequency, and the vertical axis of FIG. 24 indicates a transmission coefficient (S21 [dB]).

The conditions for measurement are as follows.

In FIG. 22, a coupling element of a reference coupler 10 is displaced by 10 mm to the right, relative to the coupling element of the coupler 1. In addition, the offset distance in the vertical direction between the couplers is set at 10 mm. Like the case of FIG. 17, a metal plate 25 is disposed on the back side of the coupler 1, with a distance of 1 mm from the coupler 1. In FIG. 23, like the case of FIG. 17, the coupling element of the reference coupler 10 is displaced by 10 mm to the left, relative to the coupling element of the coupler 1. In addition, the offset distance in the vertical direction between the couplers is set at 10 mm.

Even in the case where the position of the reference coupler 10 is displaced from the coupler 1 to the left or to the right, adequate coupler characteristics can be obtained, as will be understood from FIG. 24.

Figure 25:
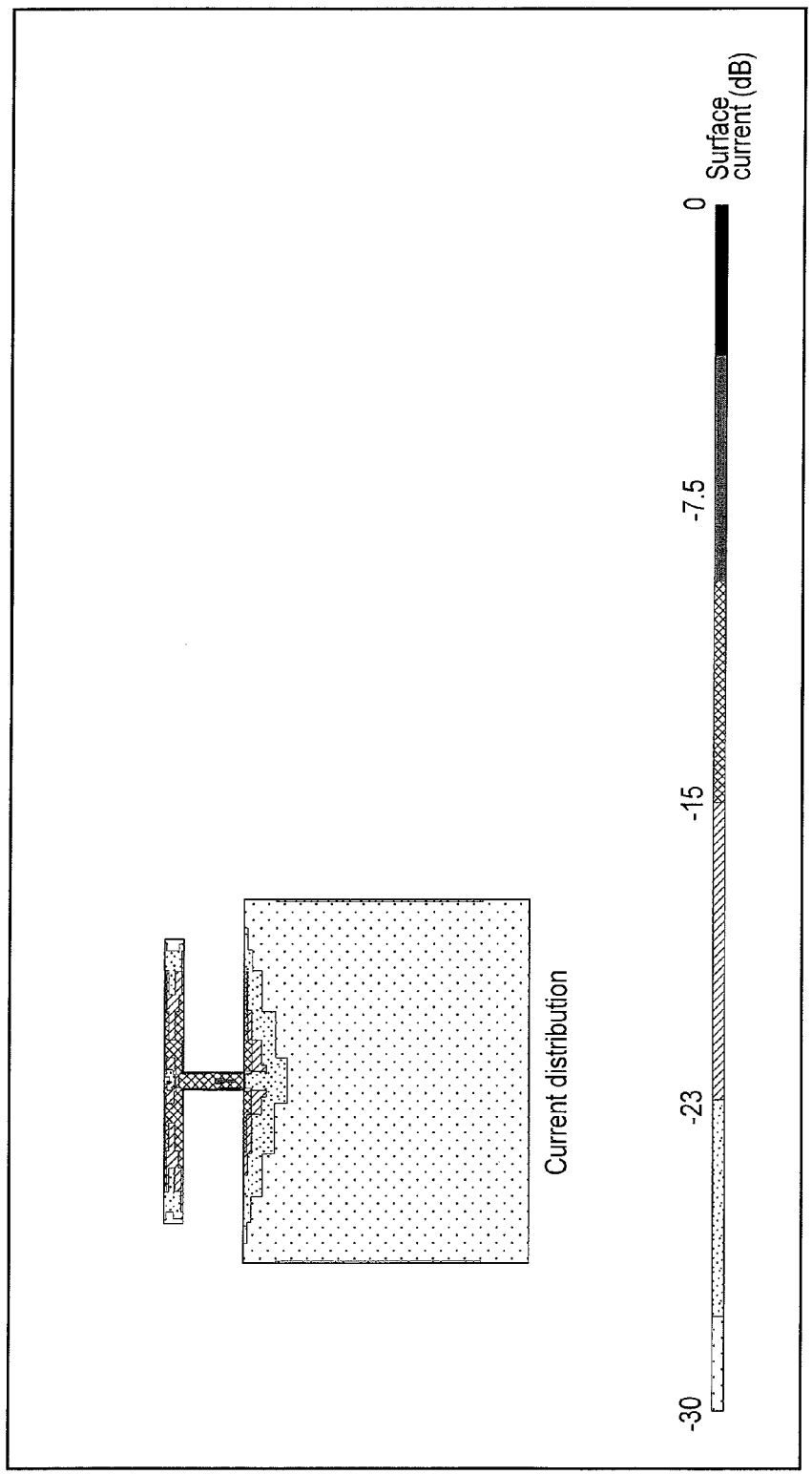
FIG. 25 shows an analysis result of a current distribution of the coupler according to the embodiment.

FIG. 25 shows an analysis result of the current (surface current) distribution of the coupler 1 in the case where the metal plate 25 is disposed on the back side of the coupler 1.

In FIG. 25, a part with a higher current amount is indicated in a color with a higher density. As is understood from FIG. 25, in the coupler 1 of the embodiment, even when a metal is positioned close to the coupler 1, a large current flows in the coupling element. In addition, a higher electric field is generated in the vicinity of the coupling element.

Figure 26:
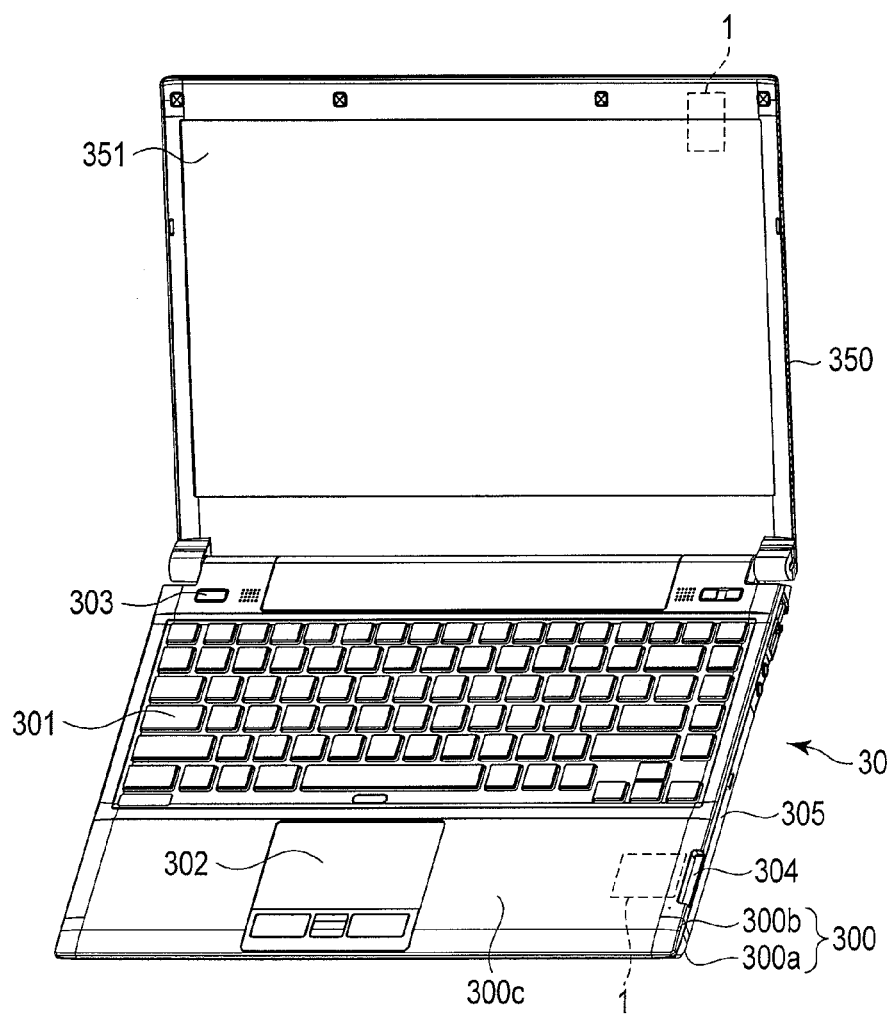
FIG. 26 is an exemplary perspective view illustrating an example of the external appearance of an electronic apparatus in which the coupler according to the embodiment is mounted.

FIG. 26 is a perspective view illustrating the external appearance of an electronic apparatus in which the coupler 1 is mounted. The electronic apparatus is realized as an information processing apparatus, for example, a battery-powerable notebook portable personal computer 30.

The computer 30 comprises a main body 300 and a display unit 350. The display unit 350 is rotatably attached to the main body 300. The display unit 350 is rotatable between an open position where a top surface of the main body 300 is exposed, and a closed position where the top surface of the main body 300 is covered. An LCD (liquid crystal display) 351 is provided in a housing of the display unit 350.

Figure 27:
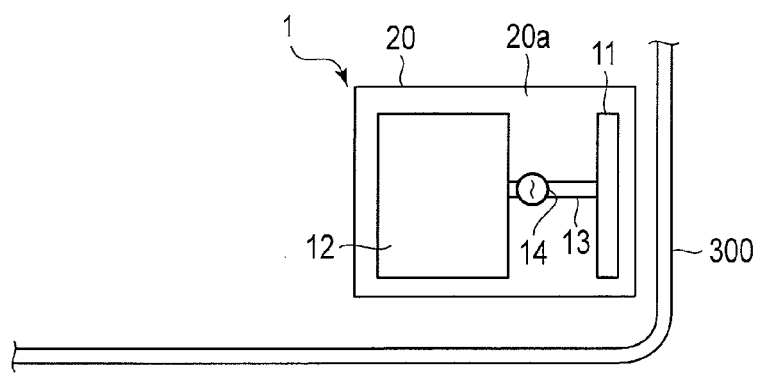
FIG. 27 is an exemplary view for describing the disposal of the coupler in the electronic apparatus of FIG. 26.

The main body 300 has a thin box-shaped housing. The housing of the main body 300 comprises a lower case 300a and a top cover 300b which is engaged with the lower case 300a. A keyboard 301, a touch pad 302 and a power switch 303 are disposed on the top surface of the main body 300. An outer wall of the housing of the main body 300, for example, a right-side wall of the housing, is provided with a card slot 304. In the example of FIG. 26, the card slot 304 is disposed on an upper part of a receiving section of an optical disc drive 305. A coupler 1 is provided in the housing of the main body 300. As shown in FIG. 27, the coupler 1 is disposed, for example, such that a coupling element 11 on a substrate 20 is opposed to the top cover 300b and to the outer wall of the housing of the main body 300. Specifically, the substrate 20 of the coupler 1 is disposed in the housing in such a direction that a first surface 20a of the substrate 20 is opposed to the top cover 300b and a first area on the substrate 20, where the coupling element 11 is disposed, is positioned closer to the outer wall (e.g. right side wall) of the housing of the main body 300 than a second area on the substrate 20, where a ground plane 12 is disposed. Thus, a part of the right side wall and a part of a palm rest area 300c of the top cover 300b function as communication surfaces.

In the meantime, the coupler 1 may be provided within the housing of the display unit 350.

Figure 28:
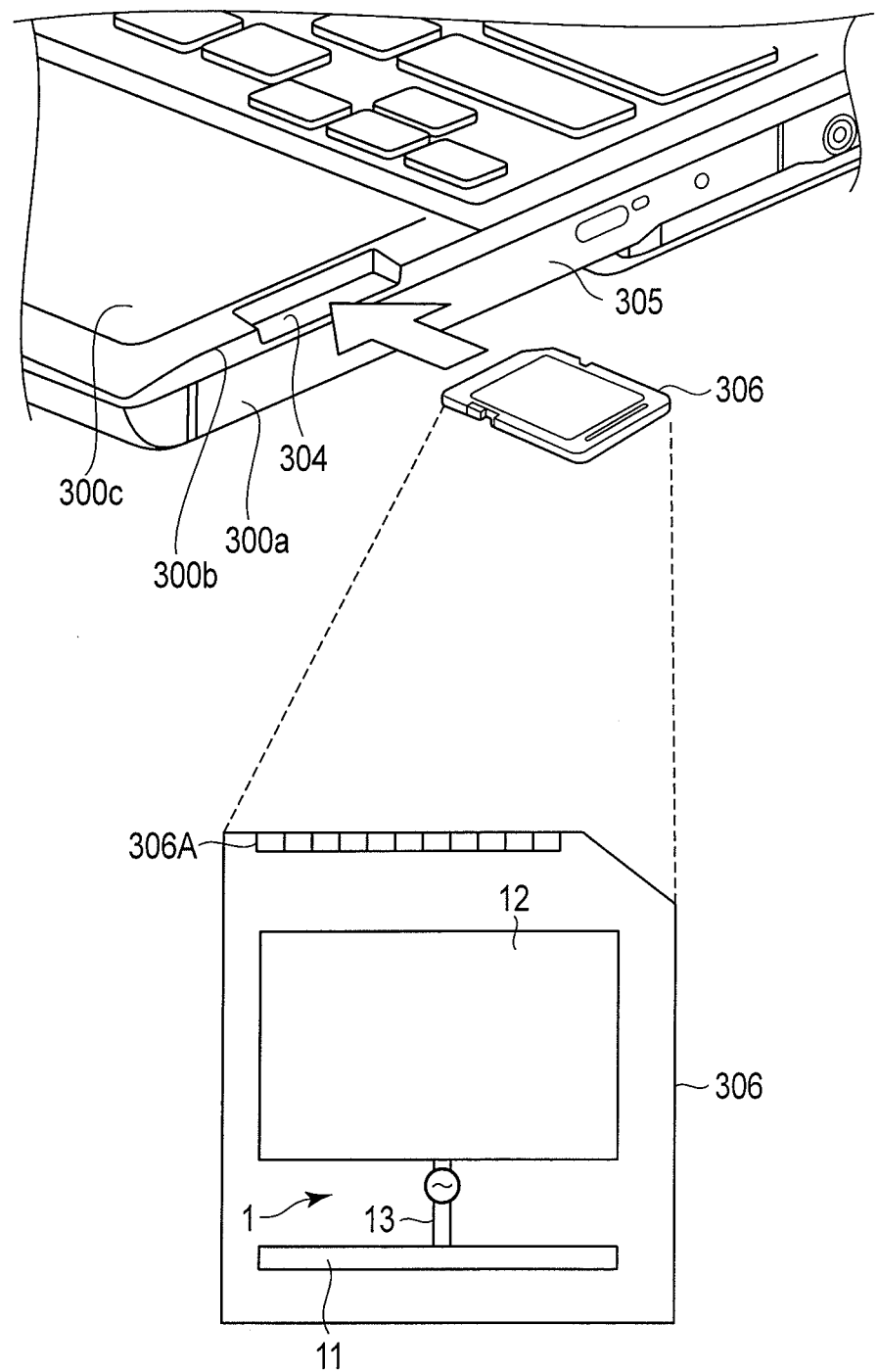
FIG. 28 is an exemplary view illustrating a state in which a card including the coupler according to the embodiment is inserted in a card slot of the electronic apparatus of FIG. 26.

In addition, as shown in FIG. 28, the coupler 1 may be provided in a card device (e.g. SD card) 306 which is detachably inserted in the card slot 304. In this case, one end portion of the card device 306 is provided with a connector 306A for an interface with a host. The coupler 1 is disposed in the card device 306 such that the coupling element 11 is positioned on the other end side of the card device 306. As has been described above, the coupler 1 is configured to have a high impedance. Thus, even when the coupler 1 is realized as the card device 306, an influence of coupling to peripheral components in the main body 300 can be reduced.

Figure 29:
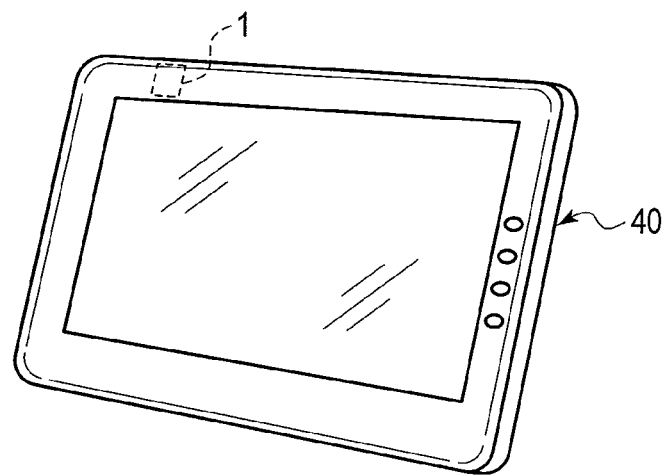
FIG. 29 is an exemplary perspective view illustrating an example of the external appearance of another electronic apparatus in which the coupler according to the embodiment is mounted.

The electronic apparatus, in which the coupler 1 is mounted, is not limited to the portable personal computer 30. FIG. 29 shows an example in which the coupler 1 is mounted in a slate PC 40.

Figure 30:
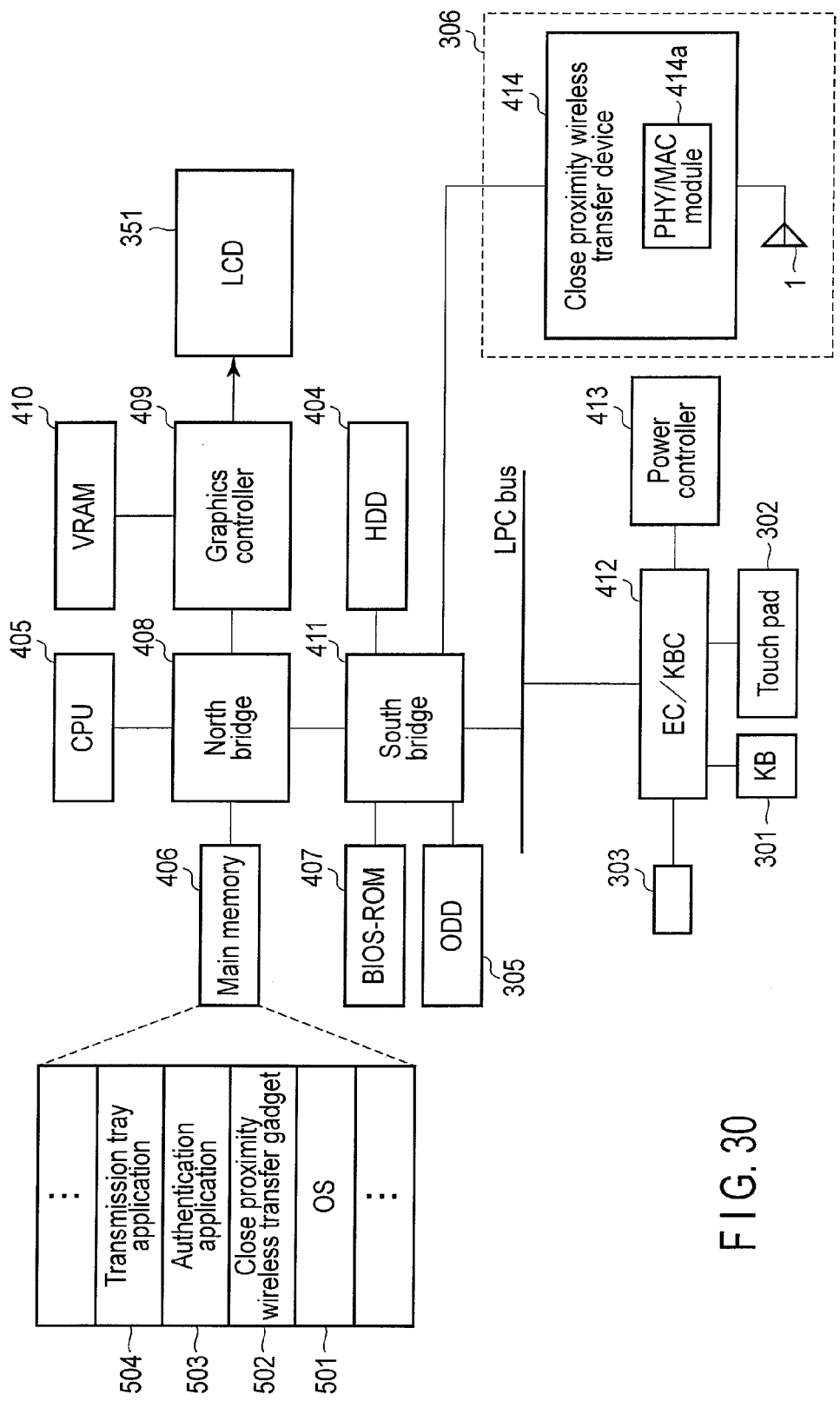
FIG. 30 is an exemplary block diagram illustrating the system configuration of the electronic apparatus of FIG. 26.

FIG. 30 is a block diagram illustrating the system configuration of the computer 30.

The computer 30 comprises a hard disk drive (HDD) 404, a CPU 405, a main memory 406, a BIOS (basic input/output system)-ROM 407, a north bridge 408, a graphics controller 409, a video memory (VRAM) 410, a south bridge 411, an embedded controller/keyboard controller IC (EC/KBC) 412, a power controller 413 and a close proximity wireless transfer device 414, in addition to the coupler 1, keyboard 301, touch pad 302, power switch 303, optical disc drive (ODD) 305 and LCD 351.

The hard disk drive 404 stores an operating system (OS) and various application programs. The CPU 405 is a processor for controlling the operation of the computer 30, and executes various programs which are loaded from the hard disk drive 404 into the main memory 406. The programs, which are executed by the CPU 405, include an operating system 501, a close proximity wireless transfer gadget application program 502, an authentication application program 503, or a transmission tray application program 504. The CPU 405 also executes a BIOS program, which is stored in the BIOS-ROM 407, in order to execute hardware control.

The north bridge 408 connects a local bus of the CPU 405 and the south bridge 411. The north bridge 408 includes a memory controller which access-controls the main memory 406. In addition, the north bridge 408 has a function of communicating with the graphics controller 409 via, e.g. an AGP bus. The graphics controller 409 controls the LCD 351. The graphics controller 409 generates a video signal, which represents a display image that is to be displayed on the LCD 351, based on display data stored in the video memory 410. The display data is written in the video memory 410 under the control of the CPU 405.

The south bridge 411 controls devices on an LPC bus. The south bridge 411 includes an ATA controller for controlling the hard disk drive 404. In addition, the south bridge 411 has a function for access-controlling the BIOS-ROM 407. The embedded controller/keyboard controller IC (EC/KBC) 412 is a one-chip microcomputer in which an embedded controller and a keyboard controller are integrated. Responding to a user's operation of the power switch 303, the embedded controller controls the power controller 413, thereby to power on/off the computer 30. The keyboard controller controls the keyboard 301 and touch pad 302. The power controller 413 controls the operation of a power supply device (not shown). The power supply device generates operation power for the respective components of the computer 30.

The close proximity wireless transfer device 414 is a communication module for executing close proximity wireless transfer. The close proximity wireless transfer device 414 comprises a PHY/MAC module 414a. The PHY/MAC module 414a operates under the control of the CPU 405. The PHY/MAC module 414a wirelessly transmits and receives signals via the coupler 1. The close proximity wireless transfer device 414 is accommodated in the housing of the main body 300.

In the meantime, the data transfer between the close proximity wireless transfer device 414 and the south bridge 411 is executed via, e.g. a PCI (peripheral component interconnect) bus. The PCI bus may be replaced with a PCI Express bus.

As has been described above, the close proximity wireless transfer device 414 and the coupler 1 may be built in the card device 306.

Although the computer 30 has been described as an example of the electronic apparatus in which the coupler 1 is mounted, this electronic apparatus may be, for instance, a TV. The coupler 1 is disposed in the housing of the TV. If the TV has a card slot, a card incorporating the coupler 1, or a card incorporating both the coupler 1 and close proximity wireless transfer device 414, may be inserted in the card slot.

Figure 31:
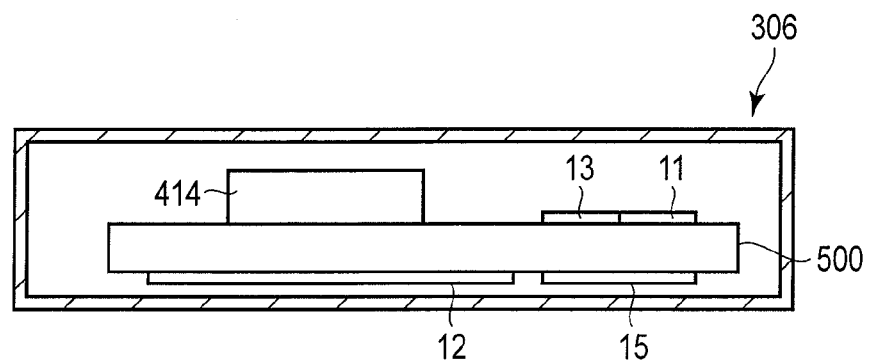
FIG. 31 is an exemplary view illustrating a structure example of a card including the coupler according to the embodiment.
Figure 32:
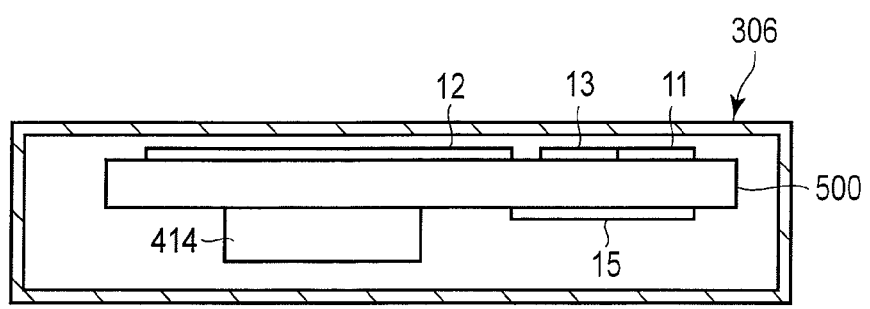
FIG. 32 is an exemplary view illustrating another structure example of the card including the coupler according to the embodiment.

Next, referring to FIG. 31 and FIG. 32, some structure examples of the card device 306 are described.

FIG. 31 shows a first structure example of the card device 306. A substrate (dielectric substrate) 500 such as a printed circuit board is provided within the housing of the card device 306. The above-described coupling element 11 and feeding element 13 are disposed in a first area on the first surface of the substrate 500. The close proximity wireless transfer device 414 is disposed in a second area on the first surface of the substrate 500. In the second area, a nonvolatile memory, for instance, may be provided in addition to the close proximity wireless transfer device 414. The short circuiting element 15 is disposed in a third area on the second surface (back surface) of the substrate 500, the third area being opposed to the first area. The short circuiting element 15 is connected to the intermediate portion A1 of the coupling element 11 via a through-hole or the like in the substrate 500. A ground layer functioning as the ground plane 12 is disposed in a fourth region on the second surface (back surface) of the substrate 500, the fourth area not being opposed to the first area. The feed point 14 may be provided on either the first surface side or second surface side. Some of ground pins of the close proximity wireless transfer device 414 are connected to the ground plane 12 via through-holes in the substrate 500.

FIG. 32 shows a second structure example of the card device 306. In FIG. 32, the above-described coupling element 11 and feeding element 13 are disposed in the first area on the first surface of the substrate 500. The ground plane 12 is disposed in the second area on the first surface of the substrate 500. The short circuiting element 15 is disposed in the third area on the second surface (back surface) of the substrate 500, the third area being opposed to the first area. The close proximity wireless transfer device 414 is disposed in the fourth region on the second surface (back surface) of the substrate 500, the fourth area not being opposed to the first area.

As has been described above, in the present embodiment, one end of the feeding element 13 is connected to the intermediate portion A1 of the coupling element 11, one end of the short circuiting element 15 is connected to the intermediate portion A1 of the coupling element 11, and the other end of the short circuiting element 15 is connected to the ground plane 12. Thus, the high impedance of the coupler 1 can be realized without preventing electric currents in opposite directions with the same current amount from flowing in the coupling element 11, that is, without weakening the tolerance to a positional displacement of the coupler 1. Therefore, it is possible to easily realize both the reduction of the influence due to peripheral components, and the sufficient tolerance to a positional displacement.

Although the resonance frequency of the coupler 1 is determined based on the above-described length of L1+L2, an element such as an inductor may be added between the coupling element 11 and feed point 14 of the coupler 1 of FIG. 1, thereby to adjust the resonance frequency of the coupler 1. FIG. 33 shows an example in which an inductor L is inserted as a resonance frequency adjusting element (lumped parameter element) in series between the feed point 14 and the coupling element 11 of the coupler 1 of FIG. 1. In FIG. 33, the inductor L is inserted in the feeding element 13. FIG. 34 shows an example in which an inductor L is inserted in series in the short circuiting element 15 of the coupler 1 of FIG. 1. FIG. 35 shows an example in which in the coupler 1 of FIG. 1, an inductor L is inserted in series between the coupling element 11 and the feed point 14, that is, in the feeding element 13, and an inductor L is inserted in series in the short circuiting element 15.

The structure in which an element such as an inductor is inserted may be applied to the coupler 1 of FIG. 10 which can be disposed on one plane. FIG. 36 shows an example in which an inductor L is inserted in series in the feeding element 13 of the coupler 1 of FIG. 10. FIG. 37 shows an example in which an inductor L is inserted in series in the short circuiting element 15 of the coupler 1 of FIG. 10. FIG. 38 shows an example in which in the coupler 1 of FIG. 10, an inductor L is inserted in series between the coupling element 11 and the feed point 14, that is, in the feeding element 13, and an inductor L is inserted in series in the short circuiting element 15.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coupler configured to transmit and receive an electromagnetic wave by electromagnetic coupling between the coupler and another coupler, the coupler comprising:
   a line-shaped coupling element comprising a first open end and a second open end;
   a ground plane;
   a feeding element electrically connecting the coupling element and a feed point, the feeding element comprising a first end electrically connected to an intermediate portion of the coupling element between the first open end and the second open end, and a second end electrically connected to the feed point; and
   a short circuiting element electrically connecting the coupling element and the ground plane, the short circuiting element comprising a third end electrically connected to the intermediate portion of the coupling element, and a fourth end connected to the ground plane,
   wherein an electrical distance from the feed point to each of the first open end and the second open end is ¼ of a wavelength corresponding to a central frequency of the electromagnetic wave.

2. The coupler of claim 1, wherein:
   the coupling element, the feeding element, the feed point and the ground plane are on a first plane, and
   the short circuiting element comprises:
      a first element extending between the first plane and a second plane, the second plane being opposed to the first plane with a gap therebetween, the first element comprising a fifth end electrically connected to the intermediate portion of the coupling element on the first plane, and a sixth end electrically connected to the second plane; and
      a second element on the second plane, the second element comprising a seventh end electrically connected to the sixth end of the first element, and an eighth end electrically connected to the ground plane on the first plane.

3. The coupler of claim 2, wherein
   an electrical distance of the first element is 1/10 or less of the wavelength corresponding to the central frequency of the electromagnetic wave.

4. The coupler of claim 1, wherein:
   a first part of the coupling element, between the intermediate portion and the first open end, and the feeding element, are configured to function as a first resonance module, and
   a second part of the coupling element, between the intermediate portion and the second open end, and the feeding element, are configured to function as a second resonance module.

5. A coupler configured to transmit and receive an electromagnetic wave by electromagnetic coupling between the coupler and another coupler, the coupler comprising:
   a substrate comprising a first surface and a second surface;
   a line-shaped coupling element on the first surface of the substrate, the coupling element comprising a first open end and a second open end;
   a ground plane on the first surface of the substrate;
   a feeding element on the first surface of the substrate, electrically connecting the coupling element and a feed point on the first surface, the feeding element comprising a first end electrically connected to an intermediate portion of the coupling element between the first open end and the second open end, and a second end electrically connected to the feed point; and
   a short circuiting element on the second surface of the substrate, electrically connecting the coupling element and the ground plane, the short circuiting element comprising:
      a first element extending between the first surface and the second surface, the first element comprising:
         a third end electrically connected to the intermediate portion of the coupling element on the first surface, and
         a fourth end electrically connected to the second surface; and
      a second element on the second surface,
      the second element comprising:
         a fifth end electrically connected to the fourth end of the first element, and
         a sixth end electrically connected to the ground plane on the first surface.

6. The coupler of claim 5, wherein an electrical distance from the feed point to each of the first open end and the second open end is ¼ of a wavelength corresponding to a central frequency of the electromagnetic wave.

7. The coupler of claim 5, wherein:
   an electrical distance from the feed point to each of the first open end and the second open end is ¼ of a wavelength corresponding to a central frequency of the electromagnetic wave,
   a first part of the coupling element between the intermediate portion and the first open end, and the feeding element, function as a first resonance module, and
   a second part of the coupling element, between the intermediate portion and the second open end, and the feeding element, are configured to function as a second resonance module.

8. The coupler of claim 5, wherein the coupler is in a card device configured to be detachably inserted in a card slot of an electronic apparatus.

9. The coupler of claim 5, wherein:
   the card device comprises a communication module electrically connected to the coupler, and
   the communication module is on the substrate of the coupler.

10. An electronic apparatus comprising a coupler configured to transmit and receive an electromagnetic wave by electromagnetic coupling between the coupler and another coupler, the electronic apparatus comprising:
    a housing;
    a communication module in the housing and electrically connected to the coupler; and
    a processor in the housing and configured to execute an application configured to control communication via the communication module,
    wherein the coupler comprises:
       a substrate comprising a first surface and a second surface;
       a line-shaped coupling element on the first surface of the substrate and comprising a first open end and a second open end;
       a ground plane on the first surface of the substrate;
       a feeding element on the first surface of the substrate and electrically connecting the coupling element and a feed point on the first surface, the feeding element comprising a first end electrically connected to an intermediate portion of the coupling element between the first open end and the second open end, and a second end electrically connected to the feed point; and a short circuiting element on the second surface of the substrate and electrically connecting the coupling element and the ground plane, the short circuiting element comprising:
- a first element extending between the first surface and the second surface, the first element comprising a third end electrically connected to the intermediate portion of the coupling element on the first surface, and a fourth end electrically connected to the second surface; and
- a second element on the second surface, the second element comprising a fifth end electrically connected to the fourth end of the first element and a sixth end electrically connected to the ground plane on the first surface.

* * * * *